(12) United States Patent
Choi et al.

(10) Patent No.: US 12,154,527 B2
(45) Date of Patent: Nov. 26, 2024

(54) ELECTRONIC DEVICE FOR CONFIGURING LUMINANCE OF DISPLAY BY USING ILLUMINACE SENSOR

(71) Applicant: SAMSUNG ELECTRONICS CO., LTD., Suwon-si (KR)

(72) Inventors: Gwangho Choi, Suwon-si (KR); Jongah Kim, Suwon-si (KR); Jeongho Cho, Suwon-si (KR); Heewoong Yoon, Suwon-si (KR); Kihyuk Lee, Suwon-si (KR); Donghan Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/082,351

(22) Filed: Dec. 15, 2022

(65) Prior Publication Data

US 2023/0118391 A1 Apr. 20, 2023

Related U.S. Application Data

(63) Continuation of application No. PCT/KR2021/003847, filed on Mar. 29, 2021.

(30) Foreign Application Priority Data

Jun. 24, 2020 (KR) .................. 10-2020-0076843

(51) Int. Cl.
*G09G 5/06* (2006.01)
*G01J 3/46* (2006.01)
*G09G 3/00* (2006.01)

(52) U.S. Cl.
CPC .............. *G09G 5/06* (2013.01); *G01J 3/462* (2013.01); *G09G 3/035* (2020.08);
(Continued)

(58) Field of Classification Search
CPC .. G09G 5/06; G09G 3/035; G09G 2320/0233; G09G 2320/0242;
(Continued)

(56) References Cited

U.S. PATENT DOCUMENTS

| 2012/0069042 A1 | 3/2012 | Ogita et al. |
| 2014/0092119 A1 | 4/2014 | Jung et al. |

(Continued)

FOREIGN PATENT DOCUMENTS

| CN | 108877737 A | 11/2008 |
| CN | 109067967 A | 12/2018 |

(Continued)

OTHER PUBLICATIONS

Communication issued Jan. 29, 2024 by the European Patent Office in European Patent Application No. 21830144.8.

(Continued)

*Primary Examiner* — Kwang-Su Yang
(74) *Attorney, Agent, or Firm* — Sughrue Mion, PLLC

(57) ABSTRACT

An electronic device includes a housing including a front surface and a rear surface; a display provided in the housing and exposed through the front surface of the housing; an illuminance sensor provided below a sensor area in an active area of the display, the active area being an area of the display in which visual information is to be displayed; and a processor connected to the display and the illuminance sensor, wherein the processor is configured to: determine an illuminance value based on data received from the illuminance sensor; obtain color information of an image displayed in the active area; determine a first color value of the active area and a second color value of the sensor area based on the color information; adjust the illuminance value based
(Continued)

on the first color value and the second color value; and configure a luminance of the display based on the adjusted illuminance value.

20 Claims, 23 Drawing Sheets

(52) U.S. Cl.
CPC .............. *G09G 2320/0233* (2013.01); *G09G 2320/0242* (2013.01); *G09G 2320/0666* (2013.01); *G09G 2320/0686* (2013.01); *G09G 2360/145* (2013.01)

(58) Field of Classification Search
CPC ... G09G 2320/0666; G09G 2320/0686; G09G 2360/145; G01J 3/462
See application file for complete search history.

(56) References Cited

U.S. PATENT DOCUMENTS

| | | | |
|---|---|---|---|
| 2014/0285535 A1 | 9/2014 | Pyo | |
| 2016/0012797 A1* | 1/2016 | Lee | G06F 1/1616 |
| | | | 345/207 |
| 2016/0195938 A1 | 7/2016 | Kim et al. | |
| 2017/0092228 A1* | 3/2017 | Cote | G09G 5/30 |
| 2017/0103707 A1 | 4/2017 | Park et al. | |
| 2018/0063435 A1 | 3/2018 | Cho | |
| 2018/0210509 A1* | 7/2018 | Jabori | G06F 1/1677 |
| 2018/0300526 A1 | 10/2018 | Cho et al. | |
| 2019/0064892 A1 | 2/2019 | Kim et al. | |
| 2019/0362675 A1 | 11/2019 | Kim et al. | |
| 2019/0384437 A1 | 12/2019 | Kim et al. | |
| 2019/0384438 A1 | 12/2019 | Park et al. | |
| 2020/0152724 A1 | 5/2020 | Cho et al. | |
| 2020/0329572 A1* | 10/2020 | Wittenberg | H05K 5/0017 |
| 2021/0210027 A1 | 7/2021 | Chen | |
| 2022/0181397 A1 | 6/2022 | Choi et al. | |

FOREIGN PATENT DOCUMENTS

| | | |
|---|---|---|
| EP | 3 243 125 A2 | 11/2017 |
| JP | 201270356 A | 4/2012 |
| KR | 1020140116659 A | 10/2014 |
| KR | 1020160085190 A | 7/2016 |
| KR | 1020170043719 A | 4/2017 |
| KR | 1020180117003 A | 10/2018 |
| KR | 1020190021663 A | 3/2019 |
| KR | 102049783 B1 | 11/2019 |
| KR | 1020190133817 A | 12/2019 |
| KR | 1020190141518 A | 12/2019 |
| KR | 1020200055330 A | 5/2020 |
| WO | 2016/111555 A2 | 7/2016 |

OTHER PUBLICATIONS

Communication issued Feb. 26, 2024 by the Korean Intellectual Property Office in Korean Patent Application No. 10-2020-0076843.

* cited by examiner

ELECTRONIC DEVICE FOR CONFIGURING LUMINANCE OF DISPLAY BY USING ILLUMINACE SENSOR

CROSS-REFERENCE TO RELATED APPLICATION(S)

This application is a bypass continuation of International Application No. PCT/KR2021/003847, filed on Mar. 29, 2021, which is based on and claims priority to Korean Patent Application No. 10-2020-0076843, filed on Jun. 24, 2020, in the Korean Intellectual Property Office, the disclosures of which are incorporated by reference herein in their entireties.

BACKGROUND

1. Field

The disclosure relates to a portable electronic device configured to configure luminance of a display by using an illuminance sensor.

2. Description of the Related Art

An electronic device may include a display and an illuminance sensor disposed below a designated area of the display (for example, region of interest (ROI) or sensor area) so as to measure external illuminance. The electronic device may adjust the luminance of the display, based on the measured illuminance. For example, the electronic device may configure a screen to be dark in a dark environment in which the external illuminance of the periphery is low, and may configure the screen to be bright in a bright environment in which the external illuminance is relatively high, thereby improving visibility.

When an illuminance sensor is disposed below a display, measured illuminance may be distorted by luminance in a sensor area.

When various images are displayed on a display, color information held by a part to be displayed in the sensor area of the display may be identical among the images, but luminance of light emitted from the sensor area (hereinafter, referred to as luminance of the sensor area) may differ. For example, the ratio of white color configured to be displayed on the display may differ among images. As an example, color information held by a part to be displayed in the sensor area may be white color in the case of first and second images alike, but the ratio of white color held by the first image may be higher than the ratio of white color held by the second image from an overall point of view. As another example, color information may be identical among images, but the position (or distribution) of white color to be displayed on the display may differ among images. As an example, color information held by a part to be displayed in the sensor area may be black color in the case of first and second images alike, but the position of white color included in the first image may differ from the position of white color included in the second image. Due to such a difference in the ratio and/or position, the luminance of the sensor area may differ when each image is displayed, although color information held by a part to be displayed in the sensor area is identical.

As a result, when the measured illuminance is corrected by using color information of the sensor area, the accuracy of correction may be reduced by a deviation (difference in the luminance and/or color).

SUMMARY

Provided is an electronic device configured to correct an illuminance value by considering a luminance deviation in a sensor area occurring when images are displayed on a display, thereby improving the accuracy of measurement regarding external illuminance.

Additional aspects will be set forth in part in the description which follows and, in part, will be apparent from the description, or may be learned by practice of the presented embodiments.

According to an aspect of the disclosure, an electronic device includes: a housing including a front surface and a rear surface: a display provided in the housing and exposed through the front surface of the housing: an illuminance sensor provided below a sensor area in an active area of the display, the active area being an area of the display in which visual information is to be displayed; and a processor connected to the display and the illuminance sensor, wherein the processor is configured to: determine an illuminance value based on data received from the illuminance sensor: obtain color information of an image displayed in the active area: determine a first color value of the active area and a second color value of the sensor area based on the color information: adjust the illuminance value based on the first color value and the second color value; and configure a luminance of the display based on the adjusted illuminance value.

The processor may be further configured to: determine the first color value based on a ratio of red, green, and blue (RGB) values of pixels in the active area obtained from the color information; and determine the second color value based on a ratio of RGB values of pixels in the sensor area obtained from the color information.

The ratio of the RGB values in the active area may include an average of R values to be displayed at the pixels in the active area, an average of G values to be displayed at the pixels in the active area, and an average of B values to be displayed at the pixels in the active area, and the ratio of the RGB values in the sensor area may include an average of R values to be displayed at the pixels in the sensor area, an average of G values to be displayed at the pixels in the sensor area, and an average of B values to be displayed at the pixels in the sensor area.

The processor may be further configured to obtain a color ratio of the second color value to the first color value, and determine a first correction value to be used in adjusting the determined illuminance value, based on the color ratio.

The processor may be further configured to: adjust the second color value to a third color value based on the first correction value: determine a noise component corresponding to a luminance of the sensor area based on the third color value; and adjust the illuminance value by removing the noise component from the illuminance value.

The display may include: a panel including pixels and power lines for supplying power to the pixels; and a display driver IC (DDI) configured to control the panel to display the visual information, and the processor may be further configured to: delimit the active area into a plurality of sections along a first direction in which the power lines extend; determine color values of the plurality of section sections based on the color information; and obtain a second correction value to be used in adjusting the determined illuminance value by adjusting the color ratio or the first correction value based on the color values of the plurality of sections.

The processor may be further configured to delimit each of the plurality of sections into a plurality of sub sections along a second direction perpendicular to the first direction.

The processor may be further configured to: delimit a first part of the active area into a plurality of first sections along a direction of extension of a first power line on which the sensor area is positioned among the power lines: delimit a second part of the active area into a plurality of second sections along a direction of extension of a second power line on which the sensor area is not positioned; and obtain a third correction value to be used in adjusting the determined illuminance value by adjusting the color ratio or the second correction value based on a difference between a color value of the first sections obtained based on the color information and a color value of the second sections obtained based on the color information.

The panel may have a quadrangular shape having a first side, a second side extending in parallel to the first side, a third side extending perpendicular to the first side, and a fourth side extending in parallel to the third side, the power lines may extend from the first side to the second side in parallel to the first side, a power supply unit may be adjacent to the first side to supply power to the pixels through the power lines, and the illuminance sensor may be adjacent to the second side.

The electronic device may further include a state sensing sensor configured to generate data used to recognize structurally different multiple states of the electronic device, the processor may be further configured to: recognize a structural state of the electronic device based on data received from the state sensing sensor; and determine the active area in a display area of the display based on the recognized state.

The housing may include a first housing and a second housing coupled to the first housing and configured to slide with respect the first housing, the display may include a first display area and a second display area, the second display area is configured to be exposed from the housing in case that the second housing slides away from the first housing and to move into the housing in case that the second housing slides toward the first housing, and the processor may be further configured to: determine the first display area as the active area based on the electronic device being in a first state in which the second display area is hidden; and determine the first display area and the second display area as the active area based on the electronic device being in a second state in which the second display area is exposed.

The second display area may be wound around a rotatable assembly provided in the second housing in case that the second housing slides toward the first housing, and is unwound from the rotatable assembly in case that the second housing slides away from the first housing, and the state sensing sensor may include an encoder sensor or a Hall sensor attached to the rotatable assembly.

The housing may include a first housing and a second housing coupled to the first housing to be able to rotate, the display may include a first display area provided on the first housing and a second display area provided on the second housing, and the processor may be further configured to: recognize that the electronic device is in a first state or a second state based on data indicating an angle between the first housing and the second housing received from the state sensing sensor; determine the first display area or the second display area as the active area based on the electronic device being in the first state; and determine the first display area and the second display area as the active area based on the electronic device being in the second state.

The state sensing sensor may include: an encoder sensor or a Hall sensor attached to a hinge assembly connecting the first housing and the second housing: or a first motion sensor provided in the first housing and a second motion sensor provided in the second housing.

According to an aspect of the disclosure, an electronic device includes: a slidable housing including a first housing and a second housing coupled to the first housing and configured to slide with regard to the first housing: a flexible display including a first area adjacent to the first housing and a second area provided in an inner space of the electronic device; an illuminance sensor provided below a sensor area in an active area of the display, the active area being an area of the display in which visual information is to be displayed: a memory storing instructions; and a processor connected to the display and the illuminance sensor, wherein the processor is configured to execute instructions to: determine an illuminance value by using data received from the illuminance sensor, obtain color information of an image displayed in the active area, determine a first color value of the active area and a second color value of the sensor area based on the color information, adjust the illuminance value based on the first color value and the second color value, and configure a luminance of the display based on the adjusted illuminance value.

According to an aspect of the disclosure, a method for controlling an electronic device including a display and an illuminance sensor provided in the display, includes: determining an illuminance value based on data received from the illuminance sensor; obtaining color information of an image displayed in an active area of the display: determining a first color value of the active area and a second color value of a sensor area in the active area based on the color information; adjusting the illuminance value based on the first color value and the second color value; and configuring luminance of the display based on the adjusted illuminance value.

The determining the first color value may include determining the first color value based on a ratio of red, green, and blue (RGB) values of pixels in the active area obtained from the color information, and the determining the second color value may include determining the second color value based on a ratio of RGB values of pixels in the sensor area obtained from the color information.

The ratio of the RGB values in the active area may include an average of R values to be displayed at the pixels in the active area, an average of G values to be displayed at the pixels in the active area, and an average of B values to be displayed at the pixels in the active area, and the ratio of the RGB values in the sensor area may include an average of R values to be displayed at the pixels in the sensor area, an average of G values to be displayed at the pixels in the sensor area, and an average of B values to be displayed at the pixels in the sensor area.

The method may further include: obtaining a color ratio of the second color value to the first color value, and determining a first correction value to be used in adjusting the determined illuminance value based on the color ratio.

The method may further include: adjusting the second color value to a third color value based on the first correction value: determining a noise component corresponding to a luminance of the sensor area based on the third color value; and adjusting the illuminance value by removing the noise component from the illuminance value.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
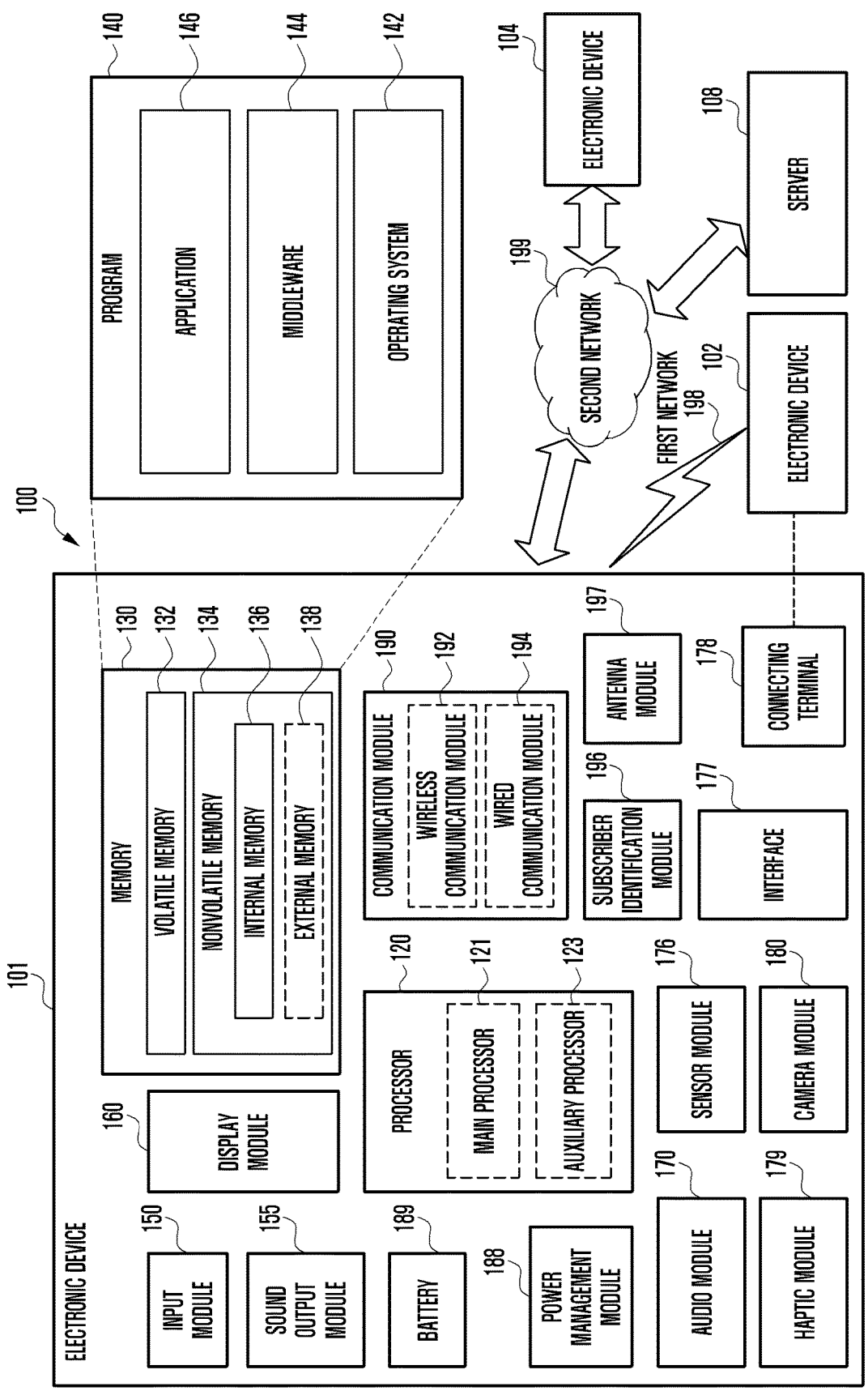
FIG. 1 is a block diagram of an electronic device inside a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
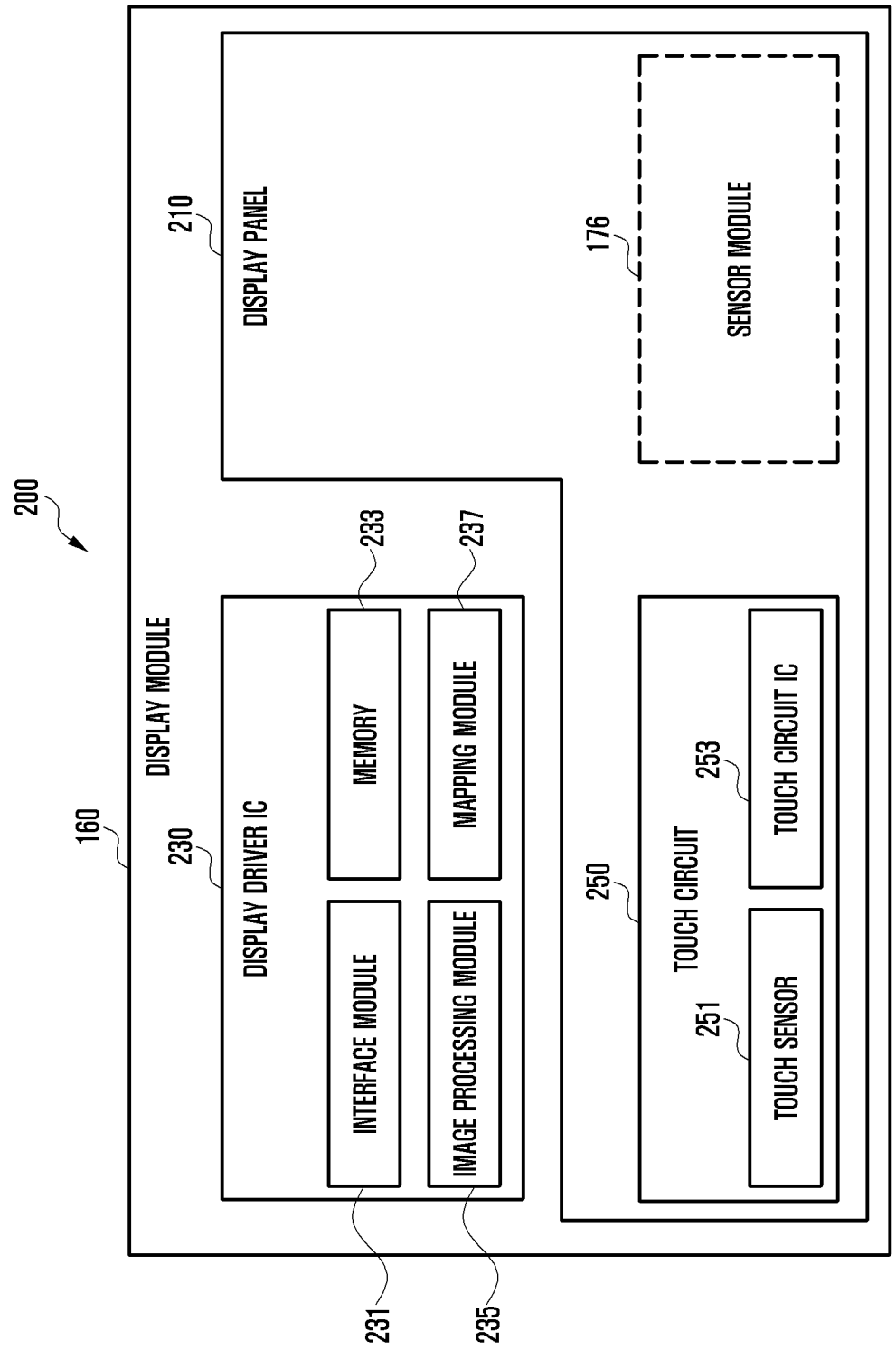
FIG. 2 is a block diagram of a display module according to various embodiments.

FIG. 2 is a block diagram 200 illustrating the display module 160 according to various embodiments. Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Housings having various structures applicable as the housing of an electronic device 101 will be described with reference to FIGS. 3 to 5. Hereinafter, a surface on which a display (for example, display module 160 in FIG. 1) is disposed will be defined as the front surface of the electronic device. The opposite surface of the front surface will be defined as the rear surface. A surface surrounding the space between the front surface and the rear surface will be defined as a side surface of the electronic device. The term "state" may refer to the structural form, appearance, or shape of an electronic device (or display).

Figure 3:
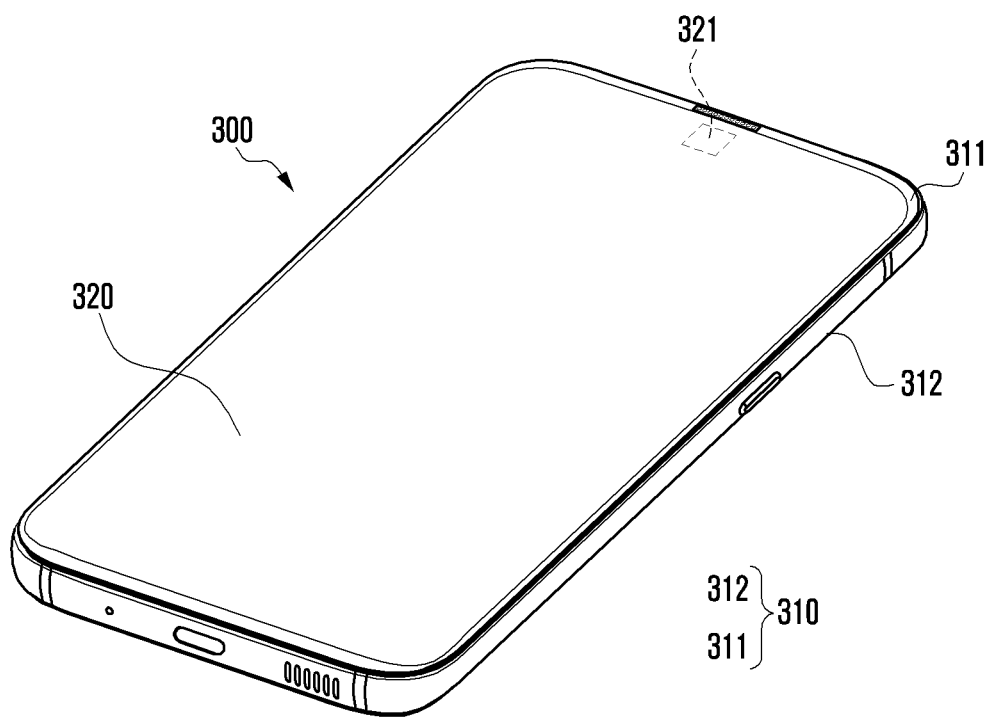
FIG. 3 illustrates a portable electronic device having a bar-type housing structure according to an embodiment.

FIG. 3 illustrates a portable electronic device 300 having a bar-type housing structure according to an embodiment. Referring to FIG. 3, the portable electronic device 300 (for example, electronic device 101 in FIG. 1) may include a housing 310, a display 320, and a sensor module. In an embodiment, the housing 310 may include a front cover 311, a rear cover, and a side frame 312. The display 320 may be disposed in a space formed between the front cover 311 and the rear cover so as to display visual information through at least a part of the front cover 311. The sensor module (for example, sensor module 176 in FIG. 1) may be disposed below the display 320 when the front surface is faced. For example, the sensor module may be disposed below a sensor area (or light-transmitting area) 321 of the display 320. The position and/or size of the sensor area 321 may be determined by the position and/or size of the illuminance sensor disposed under the sensor area 321. For example, the size (for example, diameter) of the sensor area 321 may be determined based on the field of view (FOV) of the illuminance sensor. In an embodiment, the sensor area 321 may be configured to have a lower pixel density and/or a lower wiring density than the periphery thereof, in order to improve optical transmittance.

Figure 4:
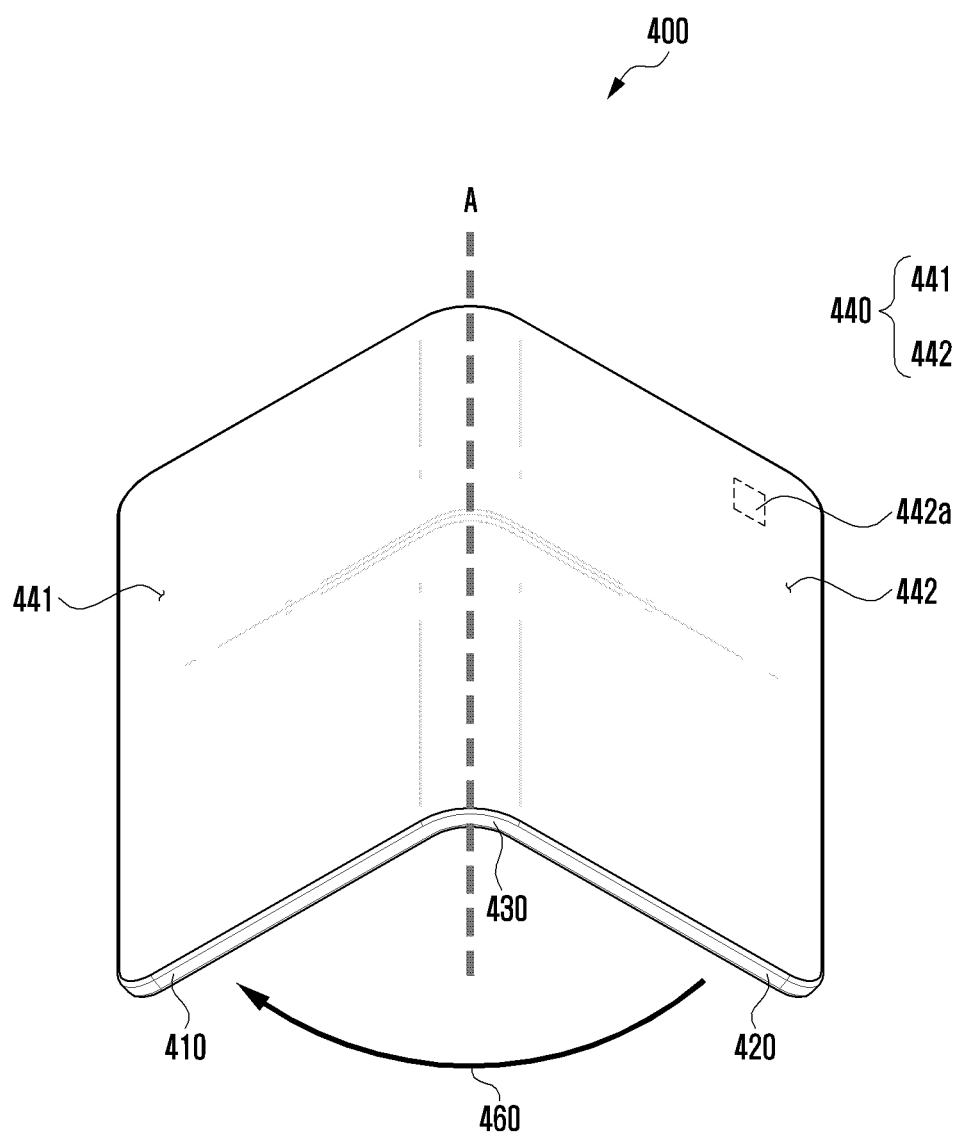
FIG. 4 illustrates a portable electronic device having a housing structure folded around a single folding axis in an out folding type according to an embodiment.

FIG. 4 illustrates a portable electronic device 400 having a housing structure folded around a single folding axis in an out folding type according to an embodiment. In connection with the portable electronic device 400, descriptions of features, functions, and/or structures identical to those in FIG. 3 may be simplified or omitted. Referring to FIG. 4, the portable electronic device 400 (for example, electronic device 101 in FIG. 1) may include a first housing 410, a second housing 420, a hinge assembly 430 configured to connect the first housing 410 and the second housing 420 such that the second housing 420 is rotatable with regard to the first housing 410, a flexible or foldable display 440 disposed in a space formed by the foldable housings 410 and 420, and a sensor module.

According to an embodiment, the display 440 may be disposed from the first housing 410 to the second housing 420 across the hinge assembly 430. The display 440 may be divided into a first display area 441 disposed in an inner space of the first housing 410 and a second display area 442 disposed in an inner space of the second housing 420 with reference to the folding axis A. The sensor module (for example, illuminance sensor) may be disposed below a sensor area 442a of the second display area 442 when the front surface is faced.

According to an embodiment, the hinge assembly 430 may be implemented as an out folding type such that, when the electronic device 400 switches from an unfolded state to a folded state, the two display areas 441 and 442 face in opposite directions. For example, when the electronic device 400 is in an unfolded state, the two display areas 441 and 442 may face in the same direction. As a result of a state transition 460 from the unfolded state to the folded state, the two display areas 441 and 442 may rotate in opposite directions.

According to an embodiment, the state of the portable electronic device 400 may be defined based on an angle between the two display areas 441 and 442. For example, the electronic device 400 may be defined to be in an unfolded state when the angle between the two display areas 441 and 442 is about 180°. The electronic device 400 may be defined to be in a folded (or closed) state when the angle between the two display areas 441 and 442 is about 360°. When the angle between the two display areas 441 and 442 is larger than the angle in the unfolded state and smaller than the angle in the folded state (for example, between about 181° to 359°), the electronic device 400 may be defined to be in an intermediate state as illustrated in FIG. 4 (or partially folded state, partially unfolded state, or freestop state).

According to an embodiment, the active area may be determined in the display 440, based on the state of the electronic device 500. For example, when the electronic device 400 is in the folded state, the active area may be determined to be the first display area 441 or the second display area 442. Among the first display area 441 and the second display area 442, an area positioned relatively above may be determined as the active area. When the electronic device 400 is in the unfolded state, the entire area of the display 440 (for example, both the first display area 441 and the second display area 442) may be determined as the active area.

Figure 5A:
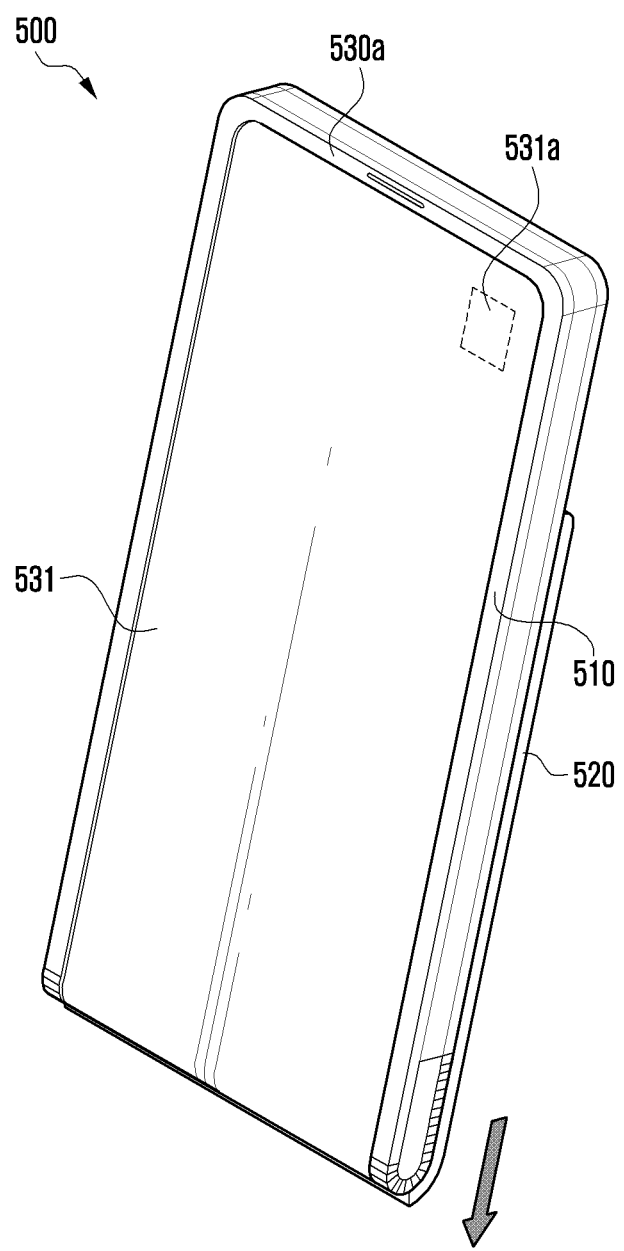
FIGS. 5A and 5B illustrate a portable electronic device having a slidable (or rollable) housing structure according to an embodiment.
Figure 5B:
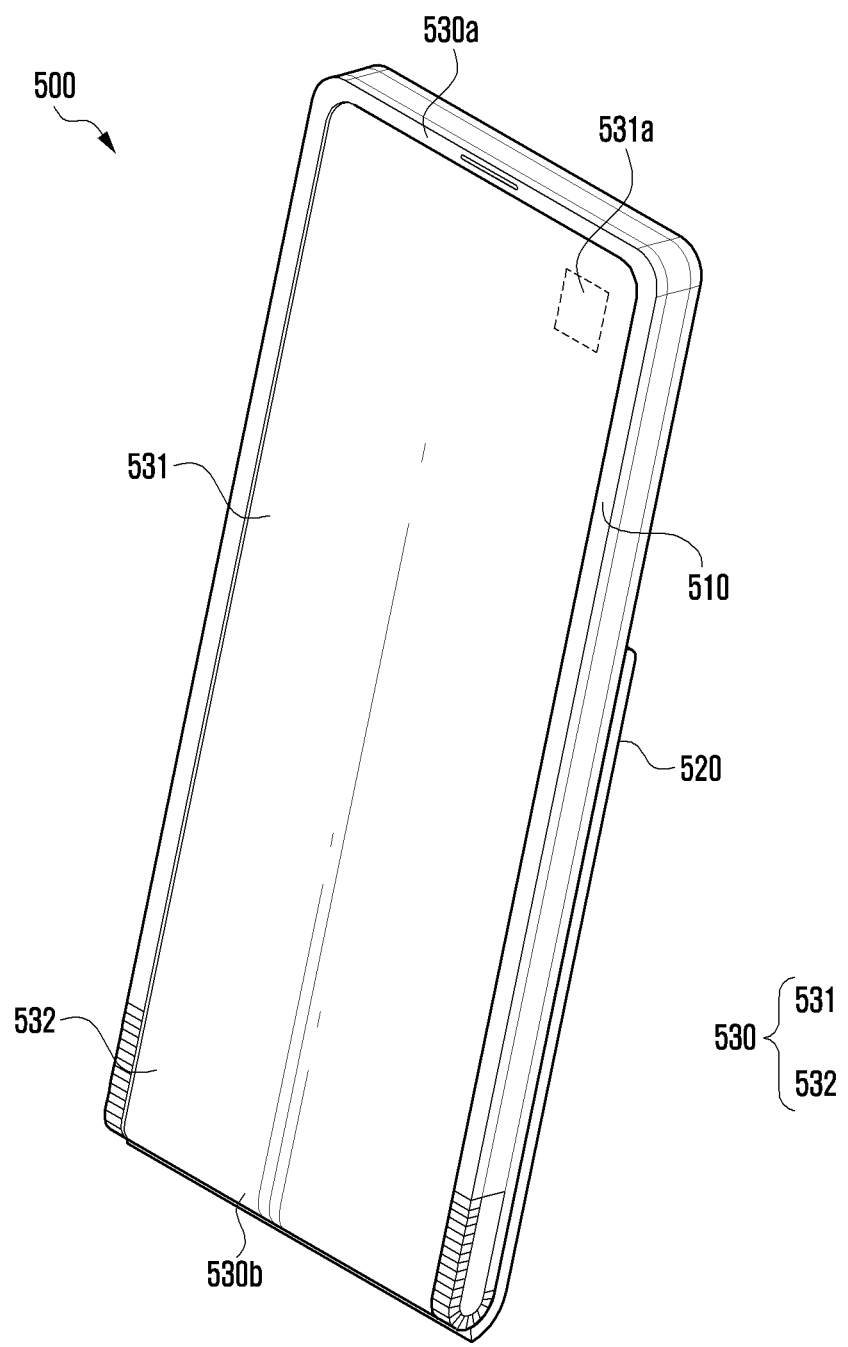

FIGS. 5A and 5B illustrate a portable electronic device 500 having a slidable (or rollable) housing structure according to an embodiment. Referring to FIG. 5A and FIG. 5B, the portable electronic device 500 (for example, electronic device 101 in FIG. 1) may include a first housing 510, a second housing 520, a rotatable assembly (or roller unit), a flexible or foldable display 530 disposed in a space formed by the slidable housings 510 and 520, and a sensor module.

According to an embodiment, the second housing 520 may be coupled to the first housing 510 to be able to slide. The rotatable assembly (or roller unit) may be disposed in the inner space of the second housing 520. The display 530 may include a first display area 531 disposed adjacent to the first housing 510 and a second display area 532 disposed in the inner space while surrounding the roller unit. The second display area 532 may move into the second housing 520 and may be wound around the rotatable assembly when the second housing 520 slides toward the first housing 510. The second display area 532 may be unwound from the rotatable assembly and may be exposed to the outside when the second housing 520 slides away from the first housing 510.

According to an embodiment, the state of the electronic device 500 may be defined based on the angle of rotation of the rotatable assembly (for example, the angle by which the rotatable assembly has rotated in the direction in which the display 530 is unwound from the rotatable assembly (for example, clockwise direction)). For example, if the angle of rotation of the rotatable assembly exceeds a first threshold value, the state of the electronic device 500 may be defined as a first state (or normal state) in which the first display area 531 is exposed (or the second display area 532 is hidden). If the angle of rotation of the rotatable assembly exceeds a second threshold value larger than the first threshold value, the state of the electronic device 500 may be defined as a second state (or extended state) in which the entire area of the display 530 (for example, first display area 531 and second display area 532) is exposed.

According to another embodiment, the state of the electronic device 500 may be defined based on the curvature (degree of bending) of a specific part of the display 530. For example, if the curvature of the second display area 532 corresponds to a value (or within a range) indicating concavity (or convexity), the state of the electronic device 500 may be defined as a first state. If the curvature of the second display area 532 corresponds to a value (or within a range) indicating flatness, the state of the electronic device 500 may be defined as a second state.

According to an embodiment, the sensor module (for example, illuminance sensor) may be disposed below a sensor area 531a of the first display area 531 when the front surface is faced.

According to an embodiment, the active area may be determined in the display 530, based on the state of the electronic device 500. For example, if the electronic device 500 is in a first state, the active area may be determined to be the first display area 531. If the electronic device 500 is in a second state, the active area may be determined to be the entire area of the display 530 (for example, first display area 531 and second display area 532).

Figure 6:
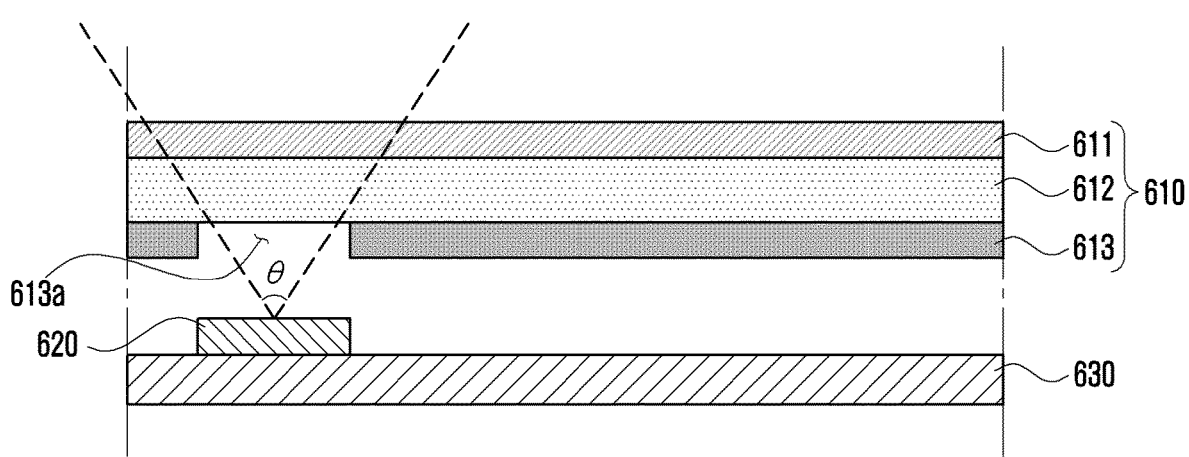
FIG. 6 is a sectional view of a display and an illuminance sensor disposed below the display according to an embodiment.

FIG. 6 is a sectional view of a display and an illuminance sensor disposed below the display according to an embodiment. Referring to FIG. 6, the display 610 and the illuminance sensor 620 may be disposed in housings having various structures described with reference to FIG. 3 to FIG. 5.

According to an embodiment, the display 610 may include a first protective cover 611, a display panel 612 (for example, display panel 210 in FIG. 2), and a second protective cover 613. The first protective cover 611 may be attached to a front surface of the display panel 612 and may be implemented by using a flexible and transparent material (for example, colorless polyimide (CPI)), for example. The second protective cover 613 may be attached to a back surface of the display panel 612 and may include a metal layer (for example, Cu sheet) and/or a light-blocking layer (for example, black embossed layer). The illuminance sensor 620 (for example, ambient light sensor (ALS)) may be positioned below the second protective cover 613 and mounted on a substrate assembly 630. An opening 613a may be formed in at least a part of the second protective cover 613 disposed above the illuminance sensor 620 such that the illuminance sensor 620 can sense external light. The opening 613a may be formed to have a position and/or a size corresponding to the field of view (FOV) angle θ of the illuminance sensor 620a. In an embodiment, the display panel 612 may have a sensor area (for example, sensor area 321 in FIG. 3 or sensor area 822b in FIG. 8) formed to have a position and/or a size corresponding to the FOV angle θ.

In an embodiment, the illuminance sensor 620 may include a package form further including a light-emitting unit. For example, the illuminance sensor 620 including a light-emitting unit may operate as a proximity sensor. In another embodiment, the illuminance sensor 620 may be included in a display panel (for example, display panel 210 in FIG. 2). For example, at least some of pixels included in the display panel 210 may include light-receiving units, thereby measuring illuminance. In this case, the opening 613a may not be formed. In addition, the sensor area may be formed to have a position and/or a size corresponding to the pixels including light-receiving units. Those skilled in the art will easily understand that the type of the illuminance sensor 620 is not limited.

Figure 7:
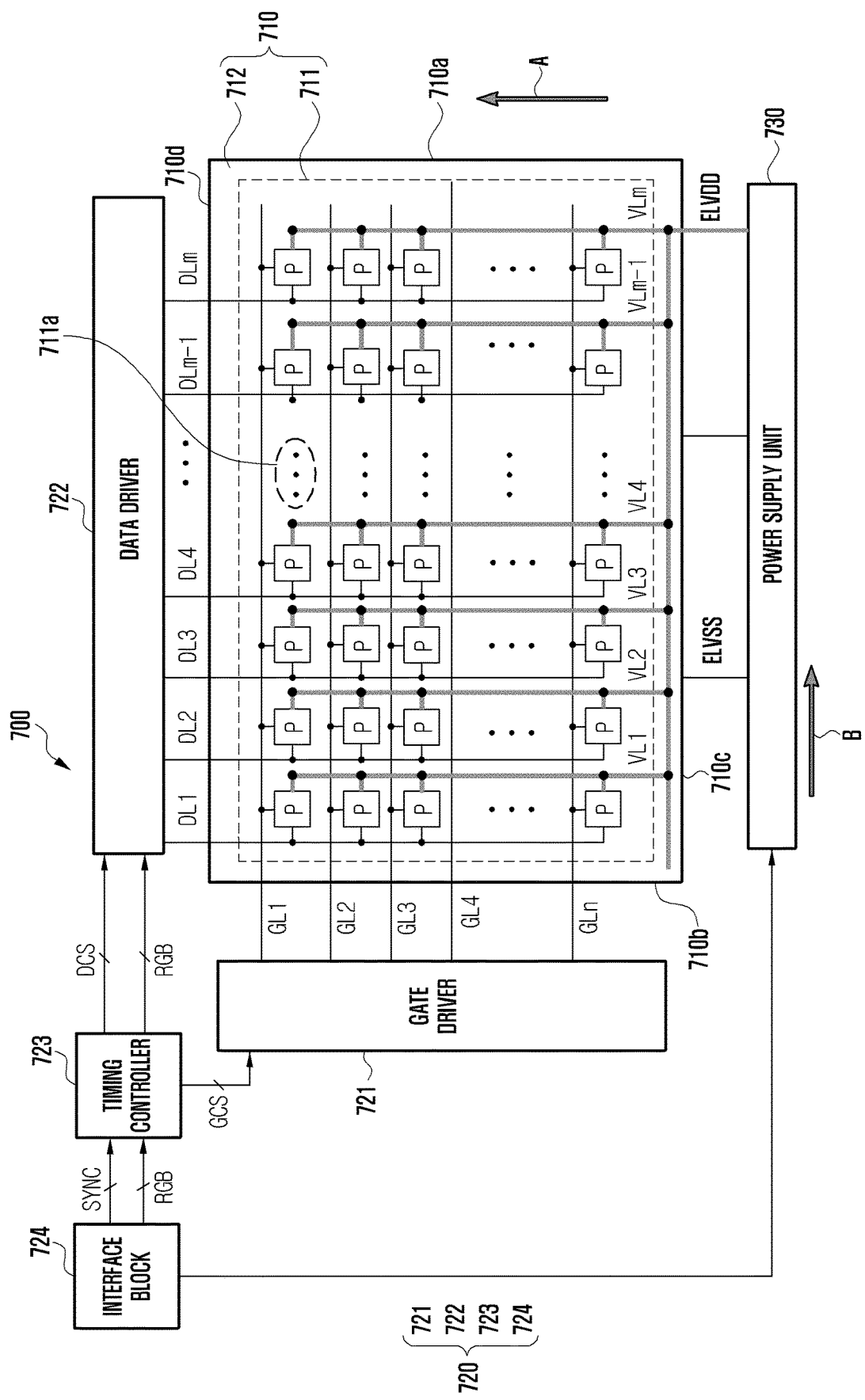
FIG. 7 illustrates the configuration of a display according to an embodiment.

FIG. 7 illustrates a configuration of a display according to an embodiment. Referring to FIG. 7, the display 700 (for example, display module 160 in FIG. 1) may include a display panel (hereinafter, simply referred to as "panel") 710 and a DDI 720. The DDI 720 (for example, DDI 230 in FIG. 2) may include a gate driver 721 (or scan driver), a data driver 722, a timing controller 723, and/or an interface block 724. A power supply unit 730 (for example, power management module 188 in FIG. 1) may generate at least one driving voltage (for example, ELVDD, ELVSS) for driving the panel 710 and may supply the generated driving voltage to the panel 710.

According to an embodiment, the panel 710 may include a display area 711 and a non-display area 712. The non-display area 712 may be an edge area of the panel 710 in which no pixel is disposed, and may be printed black, for example. The display area 711 (for example, the entire area of the display described with reference to FIG. 3 to FIG. 5) may include multiple pixels, and the pixels may include multiple sub pixels P. An illuminance sensor may be disposed below the display area 711. A part of the display area 711 may be designated as a sensor area 711a, based on the FOV angle of the illuminance sensor (for example, illuminance sensor in FIG. 6).

According to an embodiment, the panel 710 may include multiple gate lines (GL) GL1-GLn and multiple data lines (DL) DL1-DLm intersecting the multiple gate lines (GL) GL1-GLn. A sub pixel P may be formed in an area in which a GL and a DL intersect. The panel 710 may include multiple power lines (for example, VDD lines, VSS lines, Vcas lines) VL1-VLm for supplying power to the sub pixels. In an embodiment, a voltage drop (for example, IR drop) may occur in a power line VL. For example, when a current generated in the power supply unit 730 is supplied to sub pixels through a power line VL, a smaller amount of current may flow to a sub pixel disposed relatively far from the power supply unit 730 than a sub pixel disposed close to the power supply unit 730, due to a resistance component of the power line VL. As a result, even if the same color information (for example, color on pixel ratio information) is configured for pixels, the luminance and/or color may differ depending on the position of the pixels. The panel 710 may further include a compensation circuit for compensating for a voltage drop occurring in the power line VL.

According to an embodiment, the panel 710 may be of a quadrangular form having a first side (for example, right side) 710a extending in a first direction A, a second side (for example, left side) 710b extending parallel to the first side 710a, a third side (for example, lower side) 710c extending in a second direction B perpendicular to the first side 710a, and a fourth side (for example, upper side) 710d extending parallel to the third side 710c. The power lines VL1-VLm may be disposed on the panel 710 from the third side 710c to the fourth side 710d so as to be parallel to the first direction A. The power supply unit 730 may be disposed adjacent to the third side 710c, the data driver 722 may be disposed adjacent to the fourth side 710d, and the gate driver 721 may be disposed adjacent to the second side 710b. In an embodiment, as the illuminance sensor is positioned adjacent to the fourth side 710d, a part of the display area 711, which is adjacent to the fourth side 710d, may be designated as a sensor area 711a.

According to an embodiment, each sub pixel P may include an OLED and at least one driving circuit for driving the OLED. The driving circuit may include at least one thin-film transistor and at least one capacitor, may be electrically connected to one of the gate lines GL, and may be electrically connected to one of the data lines DL. The driving circuit may charge the capacitor by a data voltage supplied from the data driver 722 through a connected data line DL, in response to a scan signal received from the gate driver 721 through a connected gate line GL. The driving circuit may control the amount of current supplied to the connected OLED, according to the data voltage used to charge the capacitor. For example, each sub pixel may display visual information, at least based on a scan signal and a data signal.

According to an embodiment, the gate driver 721 may supply a scan signal (or scan pulse) to multiple gate lines GL1-GLn according to at least one gate control signal (GCS) provided from the timing controller 723. The data driver 722 may convert image data (RGB) provided from the timing controller 723 to a data voltage according to at least one data control signal (DCS) provided from the timing controller 723. The data driver 722 may successively supply the generated data voltage to multiple pixels line by line (or row by row). The timing controller 723 may align image data (RGB) provided form the interface block 724 according to the size and resolution of the panel 710. The timing controller 723 may supply the aligned image data (RGB) to the data driver 722. The timing controller 723 may transmit multiple control signals (for example, GCS, DCS) by using at least one synchronization signal (SYNC) provided from the interface block 724. The multiple control signals (for example, GCS, DCS) may include at least one gate control signal (GCS) and at least one data control signal (DCS). The gate control signal (GCS) may be a signal for controlling the driving timing of the gate driver 721. The data control signal (DCS) may be a signal for controlling the driving timing of the data driver 722. The interface block 724 may receive image data (RGB) from a processor (for example, processor 120 in FIG. 1) and may transmit the received image data (RGB) to the timing controller 723. The interface block 724 may generate at least one synchronization signal (SYNC) and may transmit the same to the timing controller 723. The interface block 724 may control the power supply unit 730 (for example, power management module 188 in FIG. 1) so as to supply at least one driving voltage (for example, ELVDD, ELVSS) to the panel 710.

Figure 8:
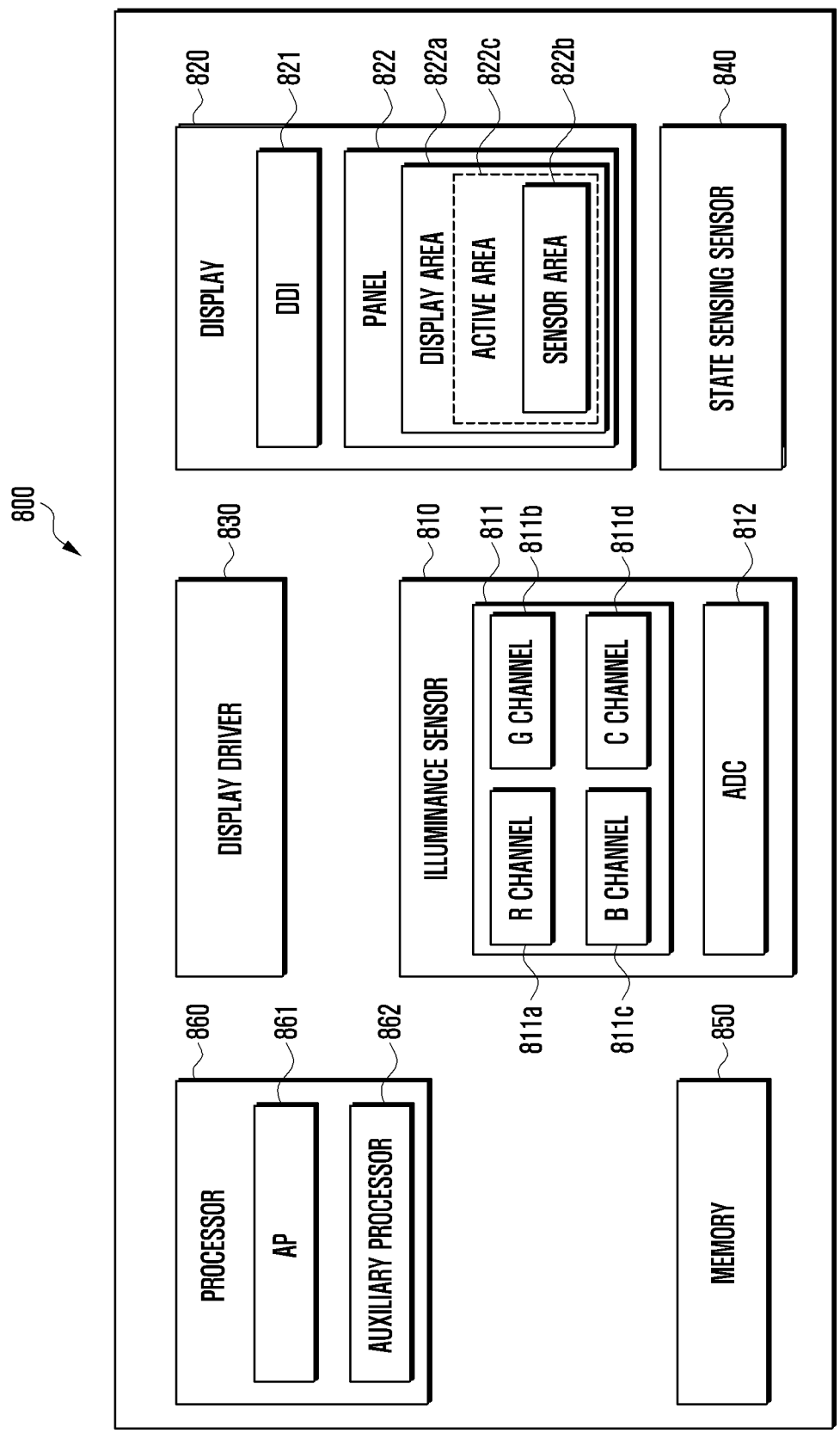
FIG. 8 illustrates the configuration of a portable electronic according to various embodiments.

FIG. 8 illustrates the configuration of a portable electronic device 800 according to various embodiments. Referring to FIG. 8, the electronic device 800 (for example, electronic device 101 in FIG. 1) may include an illuminance sensor 810, a display 820, a display driver 830, a state sensing sensor 840, a memory 850, and a processor 860.

In an embodiment, the illuminance sensor 810 (for example, illuminance sensor 620 in FIG. 6) may generate data used to identify the illuminance on the periphery of the electronic device 800. In an embodiment, the illuminance sensor 810 may include at least one photodiode and may be implemented as a single module (for example, ASCI). The illuminance sensor 810 may be subjected to molding (for example, clear molding) in order to protect internal elements of the illuminance sensor 810.

In an embodiment, the illuminance sensor 810 may include a light-receiving unit 811 for reading RGB values of visible rays and an analog-to-digital converter (ADC) 812 for digitalizing the RGB values, and may output the digitalized RGB values (ADC values) to the processor 860. For example, the light-receiving unit 811 may include a photodiode which reacts to visible rays (for example, light having wavelengths of about 400-750 nm). The light-receiving unit 811 may further include a photodiode which receives infrared rays. The light-receiving unit 811 may generate a current by means of a photoelectric effect when facing an external light source. The ADC 812 may convert a current into digital data (for example, ADC value) and may deliver the digital data to the processor 860. For example, if light is strong, data indicating a high numerical value of illuminance may be output to the processor 860, and if light is weak, data indicating a relatively low numerical value of illuminance may be output to the processor 860. The processor 860 may convert data received from the illuminance sensor 810 into an illuminance, and may control the luminance (or brightness) of the display 820 based on the illuminance.

In an embodiment, the light-receiving unit 811 may include multiple channels capable of measuring light. In an embodiment, the light-receiving unit 811 may include a red (R) channel 811a configured to receive red-series light (for example, light having wavelengths of about 550 nm-700 nm), a green (G) channel 811b configured to receive green-series light (for example, light having wavelength of about 450 nm-650 nm), a blue (B) channel 811c configured to receive blue-series light (for example, light having wavelengths of about 400 nm-550 nm), and/or a clear (C) channel 811d configured to receive white light (for example, R, G, and B all). At least one of the channels 811a, 811b, 811c, and 811d may include a photodiode. The R, G, and B channels 811a, 822b, and 811c may include a filter configured to transmit light in the corresponding series.

In an embodiment, the illuminance sensor 810 may include various light-based sensors such as a color detecting sensor (for example, picker sensor), a flicker sensor, an image sensor, a photoplethysmography (PPG) sensor, a proximity sensor, an iris sensor, a spectrometer sensor, or an ultraviolet sensor. Alternatively, the illuminance sensor 810 may be included in the display 820.

In an embodiment, the display 820 (for example, display module 160 in FIG. 1) may include a DDI 821 and a display panel 822. The DDI 821 (for example, DDI 230 in FIG. 2) may control the panel 822 (for example, display panel 210 in FIG. 2) so as to display image information. In an embodiment, the DDI 821 may control the panel 822 so as to output image information frame by frame. The DDI 821 may provide color information of an image which is to be output (or which has been output) to another element (for example, processor 860). For example, the color information may include color on pixel ratio (COPR) information. In an embodiment, the COPR information may indicate the ratio of R/G/B (R value, G, value, and B value) in connection with image data to be output in a designated area of the display 820. For example, the COPR information may indicate the average of R values to be displayed in pixels included in the designated area, respectively, the average of G values, and the average of B values. The R average value may be a red color value in the range of 0-255, the G average value may be a green color value in the range of 0-255, and the B average value may be a blue color value in the range of 0-255. For example, COPR information of an area in which a white portion included in an image to be displayed on the display 820 is displayed may have the value of (R, G, B: 255, 255, 255). The designated area may include, for example, at least one of multiple sections delimited or divided in an area in which an image is currently displayed, the entire active area 822c of the display 820, the sensor area 822b, or the active area 822c, and the multiple sections may be distinguished by coordinate values of pixels stored in the memory 850 or physical position information of the area. The physical position information of the area may include, for example, area-delimiting line information which is information (for example, line number) regarding at least one line among lines included in the display 820 (for example, GL lines, DL lines, VDD lines, VSS lines, Vcas lines).

In an embodiment, the panel 822 may include a display area 822a and a non-display area, and as the illuminance sensor 810 is disposed below the display area 822, a part of the display area 822a may be designated as a sensor area 822b, based on the position and FOV angle of the illuminance sensor 810. The sensor area 822b may be designated when the electronic device 800 is manufactured or booted. Information regarding the area designated as the sensor area 822b may be stored in the memory 850. For example, the information regarding the area may include at least one of coordinate values of pixels corresponding to the sensor area 822b, or physical position information (for example, wiring information) of the sensor area 822b.

In an embodiment, the display driver 830 may adjust the luminance of the display 820 based on control of the processor 860. In an embodiment, the display driver 830 may perform an operation of adjusting the luminance of the display 820 in real time according to illuminance identified by using the illuminance sensor 810, based on a first command from the processor 860 (hereinafter, referred to as real-time adjustment operation). For example, the display driver 830 may receive first data (for example, RT (real time)_flag) indicating a first command from the processor 860, and may perform the real-time adjustment operation according to the first data. Based on a second command from the processor 860, the display driver 830 may perform an operation of maintaining the luminance of the display 820 when the illuminance identified by using the illuminance sensor 810 is within a predetermined illuminance range and adjusting the luminance of the display 820 when the illuminance identified by using the illuminance sensor 810 is outside the illuminance range (hereinafter, referred to as hysteresis adjustment operation). For example, the processor 860 may stop transmission of first data as a second command, and the display driver 830 may accordingly perform the hysteresis adjustment operation. The hysteresis adjustment operation may prevent the display luminance from changing frequently, compared with the real-time adjustment operation. For example, in the case of the real-time adjustment operation, the display becomes brighter as the illuminance may be changed upwards, while in the case of the hysteresis adjustment operation, the display luminance may remain unchanged even if the illuminance is changed upwards to the same value. In an embodiment, the first data may include flag-type data (hereinafter, referred to as RT_flag) having at least one bit indicating the on/off state of the real-time adjustment operation (or operation to be performed among the real-time adjustment operation and the hysteresis adjustment operation). Hereinafter, RT_flag will be assumed as the first data for convenience of description, but the format of the first data is not limited thereto, and those skilled in the art will understand that any data for switching between the real-time adjustment operation and the hysteresis adjustment operation can be used as the first data. For example, the first data may be data for indicating the on/off state of the real-time adjustment operation or the hysteresis adjustment operation. In an embodiment, the processor 860 may periodically generate the first data. For example, the processor 860 may generate the first data once in a designated period (for example, 100 ms).

In an embodiment, the display driver 830 may be implemented as software. Accordingly, the processor 860 may be configured to execute the display driver 830 so as to perform the operations of the display driver 830. In this case, operations of the display driver 830 may mean operations of the processor 860.

In an embodiment, the state sensing sensor 840 (for example, sensor module 176 in FIG. 1) may generate data used to recognize the state of the electronic device 800. In an embodiment, when the electronic device 800 includes a foldable housing or a rollable housing, the state sensing sensor 840 may include a sensor (for example, encoder or Hall sensor) attached to a hinge assembly (for example, hinge assembly 430 in FIG. 4) or a rotatable assembly (for example, rotatable assembly provided in electronic device 50 in FIG. 5) so as to generate and output data corresponding to an angle. In another embodiment, the state sensing sensor 840 may include a motion sensor (for example, acceleration sensor and/or gyro sensor) disposed in the housing inner space of the electronic device 800. For example, the state sensing sensor 840 may include a first motion sensor disposed in the first housing (for example, first housing 410 in FIG. 4) so as to generate data corresponding to the position and/or movement of the first housing, and a second motion sensor disposed in the second housing (for example, second housing 420 in FIG. 4) so as to generate data corresponding to the position and/or movement of the second housing. In another embodiment, the state sensing sensor 840 may include a sensor (for example, pressure sensor) disposed on a designated portion (for example, second display area 532 in FIG. 5) of the display so as to generate data corresponding to the curvature of the corresponding portion.

In an embodiment, the memory 850 (for example, memory 130 in FIG. 1) may store instructions which, when executed, cause the processor 860 to perform operations of the display driver 830 (for example, real-time adjustment operation and/or hysteresis adjustment operation), based on data received from the state sensing sensor 840. The memory 850 may be a memory of the DDI 821 or may include at least a part of the memory. In an embodiment, the memory 850 may store a lookup table (for example, Table 1) used for the real-time adjustment operation. For example, during the real-time adjustment operation, the processor 860 may identify a luminance code corresponding to the peripheral illuminance in Table 1, and may configure or set the luminance corresponding to the identified code as the luminance of the display 820. In an embodiment, the memory 850 may store a lookup table (for example, Table 2) used for the hysteresis adjustment operation. The processor 860 may configure luminance corresponding to illuminance acquired from the illuminance sensor 810 immediately before the display 820 is turned on (for example, wakeup illuminance) as the luminance of the display 820, and may then turn the display 820 on. After the display 820 is turned on, the processor 860 may perform the hysteresis adjustment operation. For example, referring to Table 2, when the wakeup illuminance is 10 lux, the down hysteresis may be configured to be 1 lux, and the up hysteresis may configured to be 81 lux. Accordingly, if measured illuminance is 1 lux or less, a luminance lower than the wakeup luminance may be configured as the screen luminance. If the measured illuminance is 81 lux or higher, a luminance higher than the wakeup luminance may be configured as the screen luminance.

TABLE 1

| Illuminance (lux) | Luminance code | Luminance (cd) |
|---|---|---|
| 0 | 1 | 10 |
| 1 | 2 | 15 |
| 2 | 3 | 20 |
| 3 | 4 | 25 |
| 4 | 5 | 30 |
| 5 | 6 | 35 |
| ... | ... | ... |
| 100 | 255 | 500 |

TABLE 2

| Luminance per illuminance Default | | | Luminance per hysteresis | | | |
|---|---|---|---|---|---|---|
| | | | When becoming darker | | When becoming brighter | |
| Illuminance (lux) | Luminance (cd/m²) | Code | Down reference (lux) | Down luminance (cd/m²) | Up reference (lux) | Up luminance (cd/m²) |
| 0 | 38 | 26 | — | — | 10 | 60 |
| 1 | 41 | 28 | — | — | 17 | 70 |
| 2 | 43 | 30 | — | — | 24 | 80 |
| 3 | 46 | 32 | — | — | 31 | 80 |
| 4 | 48 | 35 | — | — | 38 | 80 |
| 5 | 51 | 37 | — | — | 45 | 90 |
| 6 | 54 | 39 | — | — | 52 | 90 |
| 7 | 56 | 42 | — | — | 59 | 100 |
| 8 | 59 | 44 | — | — | 66 | 100 |
| 9 | 62 | 46 | — | — | 73 | 120 |
| 10 | 64 | 48 | 1 | 39 | 81 | 130 |
| ... | ... | ... | ... | ... | ... | ... |
| 15 | 77 | 60 | 2 | 42 | 122 | 150 |
| ... | ... | ... | ... | ... | ... | ... |
| 20 | 90 | 71 | 3 | 43 | 156 | 200 |
| ... | ... | ... | ... | ... | ... | ... |
| 25 | 104 | 83 | 4 | 45 | 186 | 300 |
| ... | ... | ... | ... | ... | ... | ... |
| 50 | 169 | 140 | 10 | 68 | 302 | 500 |
| ... | ... | ... | ... | ... | ... | ... |
| 100 | 300 | 255 | 40 | 100 | 402 | 1000 |

In an embodiment, the instructions may cause the processor 860 to perform the operations of: measuring illuminance by using the illuminance sensor 810; acquiring a first color value regarding the active area 822c (for example, entire display area 822a) of the panel 822 and a second color value regarding the sensor area 822b inside the active area 822c; calculating a correction value to be used when correcting the measured illuminance value, based on the ratio between the first and second color values; calculating an illuminance value (for example, noise component) corresponding to the luminance of the sensor area 822b, based on the second color value and the correction value; and removing the noise component from the illuminance value acquired by using the illuminance sensor, thereby correcting the illuminance value.

According to an embodiment, the panel 822, the sensor area 822b, the power supply unit, and the power lines may be configured in the type and structure as in FIG. 7. Accordingly, the instructions may cause the processor 860 to perform the operations of: delimiting (or dividing) the active area 822c into multiple sections (for example, entire active area 822c, lower section, center section, and upper section) along a direction in which the power lines (for example, power lines VL1-VLm) extend (for example, second direction B in FIG. 7); delimiting respective sections delimited by using the power lines into multiple sub sections along a direction in which gate lines (for example, gate lines GL1-GLm in FIG. 7) extend (for example, first direction A in FIG. 7): acquiring color information from the DDI 832 with regard to each delimited sub section; and correcting the ratio by using the color information acquired with regard to each sub section. The operation of acquiring color information with regard to each delimited sub section may include an operation of acquiring the R/G/B ratio of pixels included in each sub section. For example, the R/G/B ratio may include a mean value, a median value, or a mode value regarding each of R/G/B (for example, a value appearing the most frequently among values), for example, as values representing the R value, G value, and B value of pixels included in each sub section.

According to an embodiment, the active area 822c in which visual information (for example, texts, images, or icons) is to be displayed may be expanded or reduced according to the state of the electronic device 800 as described above with reference to FIG. 4 and FIG. 5. Accordingly, the instructions may cause the processor 860 to perform the operations of: determining the active area 822c in which visual information is to be displayed, in the display area 822a, based on a change in state of the electronic device 800; and delimiting the determined active area 822c into multiple sections. For example, referring to FIG. 5A and FIG. 5B, the sensor area 822b may be disposed inside the first housing 510 to be adjacent to the upper side 530a (for example, fourth side 710d in FIG. 7) of the display 530. The power supply unit may be disposed inside the second housing 520 to be adjacent to the lower side 530b (for example, third side 710c in FIG. 7) of the display 530. Power lines (for example, power lines VL1-VLm) connected to the power supply unit may extend from the lower side 530b to the upper side 530a. When the electronic device 500 is in a first state (for example, normal state), the active area may be the first display area 531, and the processor 860 may accordingly delimit the first display area 531 into multiple sections (for example, two sections at an identical interval) along the first direction (for example, first direction A in FIG. 7) in which the power lines extend. The processor 860 may delimit or divide each delimited section into multiple sub sections (for example, each sub section may be delimited into two sections at an identical interval, a total of four sub sections) along the second direction (for example, second direction B in FIG. 7) in which gate lines extend. As the electronic device 500 undergoes a state change from the first state to the second state (for example, state in which the second display area 532 is exposed), the processor 860 may adjust the active area to the entire area (for example, first display area 531 and second display area 532) of the display 530. As the active area is expanded to the entire area, the processor 860 may delimit the entire area into multiple sections (for example, three sections) along the first direction and may delimit each section into multiple sub sections (for example, each sub section may be delimited into two sections, a total of six sections) along the second direction.

In an embodiment, the processor 860 (for example, processor 120 in FIG. 1) may include an application processor (AP) 861 and/or an auxiliary processor 862, and may be operatively connected to the illuminance sensor 810, the display 820, the display driver 830, the state sensing sensor 840, and the memory 850. The processor 860 may adjust the luminance of the display 820 by using data received from the illuminance sensor 810 and/or the state sensing sensor 840. The AP 861 may convert data received from the illuminance sensor 810 into an illuminance value, and may correct the illuminance value by using data (for example, color information of visual information to be displayed in the active area 822c and the sensor area 822b) received from the display 820 (for example, DDI 821). The auxiliary processor 862 (for example, sensor hub processor) may control overall driving of the sensor module (for example, sensor module 176 in FIG. 1). The auxiliary processor 862 may be used to collect data from the sensor module and to process the data while consuming less power than the AP 861. For example, the auxiliary processor 862 may convert data received from the illuminance sensor 810 into an illuminance value, may read a luminance corresponding to the illuminance value from a lookup table (for example, Table 1), and may transfer the luminance to the DDI 821. The auxiliary processor 862 may correct the illuminance value, based on color information of an image displayed in the panel 822 (for example, active area 822c and sensor area 822b), thereby preventing peripheral illuminance from being distorted by driving of the display 820. According to an embodiment, the auxiliary processor 862 may be omitted from elements of the electronic device 800, and the AP 861 may then perform functions of the auxiliary processor 862.

In an embodiment, the processor 860 (for example, AP 861 and/or auxiliary processor 862) may convert data received from the illuminance sensor 810 into an illuminance value. The processor 860 may perform a real-time adjustment operation or a hysteresis adjustment operation, at least based on the illuminance value.

In an embodiment, the processor 860 (for example, AP 861 and/or auxiliary processor 862) may recognize the state of the electronic device 800 by using data received from the state sensing sensor 840. For example, when the electronic device 800 is a foldable device or a rollable device, the processor 860 may use data received from the state sensing sensor 840 so as to calculate at least one of the angle between display areas, the angle of rotation of the rotatable assembly (for example, rotatable assembly in FIG. 5), or the curvature of a specified part (for example, second display area 532 in FIG. 5) of the display, and may recognize the state of the electronic device 800 based on the data acquired as a result of calculation. The processor 860 may determine the active area 822c in which visual information is to be displayed in the display area 822a, based on the state of the electronic device 800.

In an embodiment, the processor (for example, AP 861 and/or auxiliary processor 862) may configure a measurement time (for example, integration time) for which the illuminance sensor 810 acquires light and a measurement cycle, based on the cycle of turn-on and turn-off of the display 820 and/or the ratio of turn-off (for example, AMOLED off ratio (AOR)). For example, the display 820 may display a frame while repeating turn-on and turn-off multiple times. In an embodiment, illuminance of the periphery of the electronic device 800 may be distorted by the influence of turn-on of the display 820. In order to prevent such distortion, the processor 860 may convert data received from the illuminance sensor 810 at a time at which the display 820 is turned off into an illuminance value.

In an embodiment, the processor (for example, AP 861 and/or auxiliary processor 862) may measure the illuminance of the periphery of the electronic device 800 by using data received from the illuminance sensor 810. The processor 860 may correct the illuminance value obtained as a result of measurement, based on color information of an image displayed in the panel 822 (for example, active area 822c and sensor area 822b), thereby preventing the peripheral illuminance from being distorted by driving of the display 820.

Figure 9:
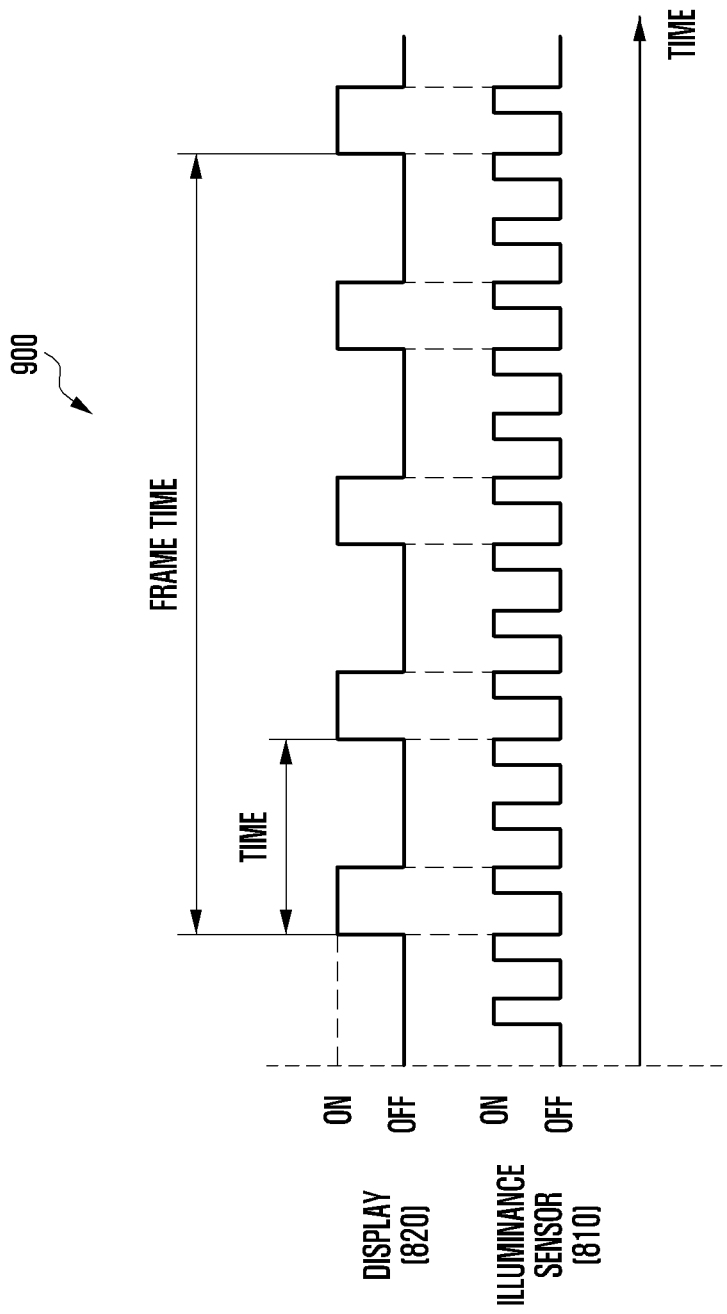
FIG. 9 illustrates an illuminance measuring operation based on periods in which a display is turned on and turned off, according to an embodiment.

FIG. 9 is a diagram 900 illustrating an illuminance measuring operation based on periods in which a display is turned on and turned off, according to an embodiment. Referring to FIG. 8 and FIG. 9, the display 820 may repeat turn-on and turn-off multiple times during a period of time in which a frame is displayed. A period of time (for example, 16.6 ms) during which scan lines (for example, data lines, gate lines, power lines) of the display 820 all operate successively may be a time during which a frame is displayed (frame time). Turn-on and turn-off of the display 820 may be repeated multiple times (for example, four times) during the frame time. A single period of time for turn-on and turn-off may be referred to as a duty, and the ratio of turn-on time of a duty (for example, 4.16 ms) against the entire time may be referred to as a duty ratio.

In an embodiment, the illuminance sensor 810 may repeat turn-on and turn-off multiple times during a single frame time. The period in which the illuminance sensor 810 is turned on and turned off may be shorter than the period in which the display 820 is turned on and turned off.

In an embodiment, the processor 860 may configure the period in which the display 820 is turned on and turned off, and a duty ratio. The processor 860 may configure the turn-on time of the illuminance sensor 810 to be shorter than the turn-on time of the display 820 such that the illuminance sensor 810 can be turned on while the display 820 is turned off. The processor 860 may calculate an illuminance value by using data received from the illuminance sensor 810 when the display 820 is turned off. The processor 860 may exclude data received form the illuminance sensor 860 when the display 820 is turned on, in connection with calculating the illuminance value.

Figure 10:
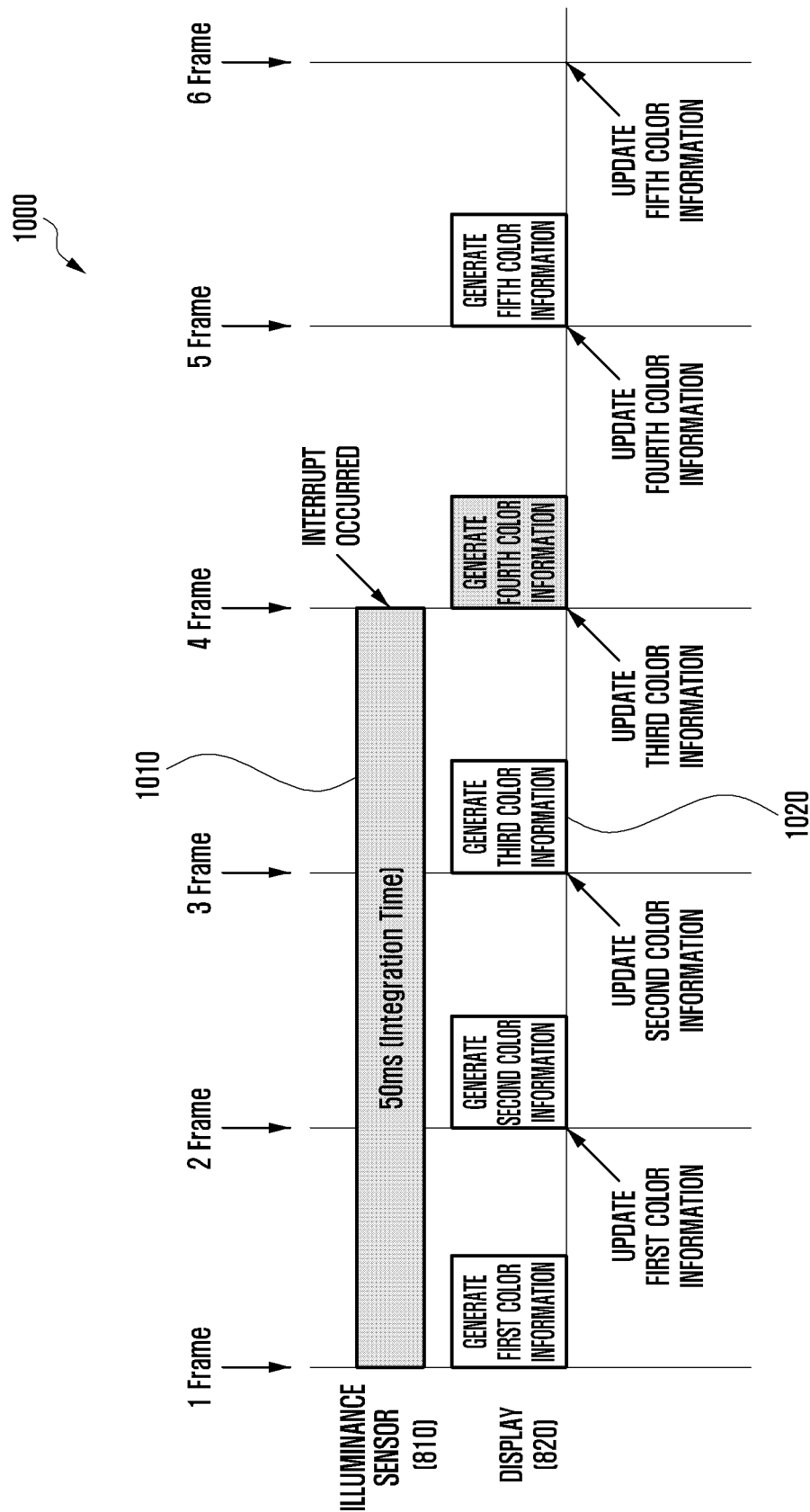
FIG. 10 illustrates an illuminance correcting operation based on image color information according to an embodiment.

FIG. 10 is a diagram 1000 illustrating an illuminance correcting operation based on image color information according to an embodiment. Referring to FIG. 8 and FIG. 10, the illuminance sensor 810 may receive light during a designated measurement time (for example, 50 ms) 1010, may convert the received light into data, and may provide the data to the processor 860. The illuminance sensor 810 may generate an interrupt signal at the time point at which the data is provided.

In an embodiment, the display 820 (for example, DDI 821) may display image information frame by frame in an active area (for example, active area 822*c* in FIG. 8) during each designated frame time (for example, 16.6 ms), may generate color information corresponding to a frame to be displayed in the active area, and may provide the color information to the processor 860 (for example, AP 861 or auxiliary processor 862).

In an embodiment, the processor 860 may update color information stored in the memory 850 according to color information received from the display 820 (for example, DDI 821) or the display driver (for example, display driver 830 in FIG. 8). The processor 860 may recognize the occurrence of an interrupt signal and may accordingly identify color information (for example, referring to FIG. 10, third color information 1020 regarding a third frame displayed on the display 820) in the memory 1050.

In an embodiment, the processor 860 may measure the illuminance of the periphery of the electronic device 800 by using data received from the illuminance sensor 810, and may correct the illuminance value obtained as a result of the measurement, based on color information identified in response to the occurrence of an interrupt. For example, the processor 860 may acquire the ratio of R in the active area 822*c* (hereinafter, referred to as A (active area)_COPR R), the ratio of G (A_COPR G), and the ratio of B (A_COPR B) from color information (for example, third color information 1020) identified in the memory 850. The processor 860 may acquire the ratio of R in the sensor area 822*b* (hereinafter, referred to as S (sensor area)_COPR R), the ratio of G (S_COPR G), and the ratio of B (S_COPR B) from the color information. Additionally, the processor 860 may acquire COPR R/G/B regarding each delimited section (or sub section) form the color information. The processor 860 may calculate an illuminance value (for example, noise component) corresponding to the luminance of the sensor area 822*b*, based on the acquired ratio information, and may remove the noise component from the illuminance value obtained as a result of the measurement, thereby correcting the illuminance value so as to converge toward the actual illuminance on the periphery of the electronic device 800. For example, the ratio of R in the active area 822*c* (A_COPR R) may correspond to a value that represents the R of an image to be displayed in the active area 822*c*, such as a mean value, a median value, or a mode value. The ratio of R in the sensor area 822*b* (S_COPR R) may correspond to a value that represents a part of the image to be displayed in the sensor area 822*b*, such as a mean value, a median value, or a mode value.

When images are displayed in the active area in an environment having the same external illuminance, the luminance in the sensor may differ when each image is displayed even if color information (for example, COPR information) held by a part to be displayed in the sensor area is identical among images. Therefore, the illuminance value (for example, noise component) corresponding to the luminance of the sensor area may be calculated differently among images. Consequently, the noise component may be calculated differently each time, and correction of the illuminance value acquired by using the illuminance sensor 810 may become inaccurate due to such a deviation. An embodiment to be described below with reference to FIG. 11 and FIG. 12 may provide an electronic device configured to reduce the above-mentioned deviation such that the accuracy of correction can be improved.

Figure 11:
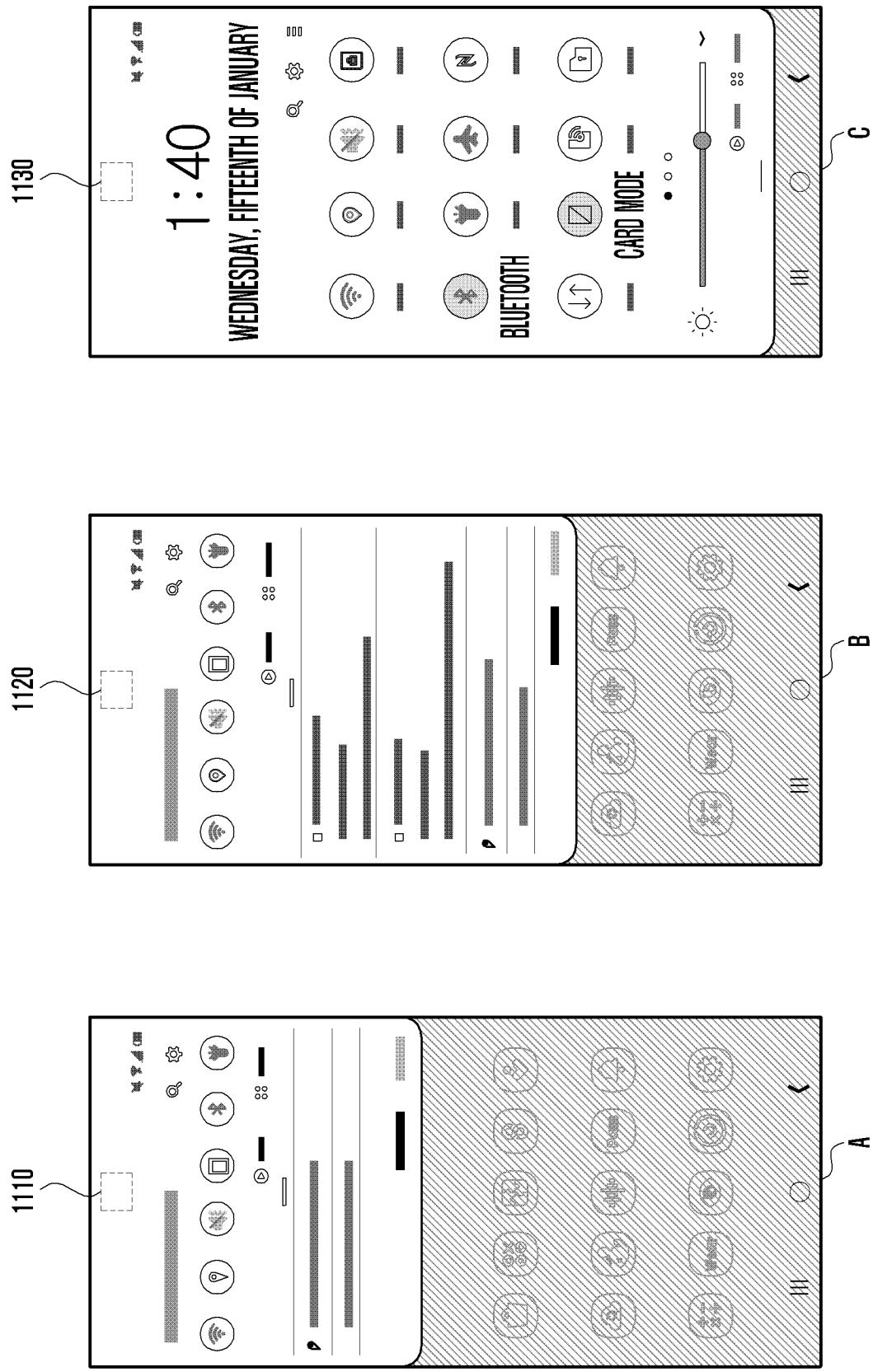
FIG. 11 illustrates images that may be displayed in an active area of a display.
Figure 12:
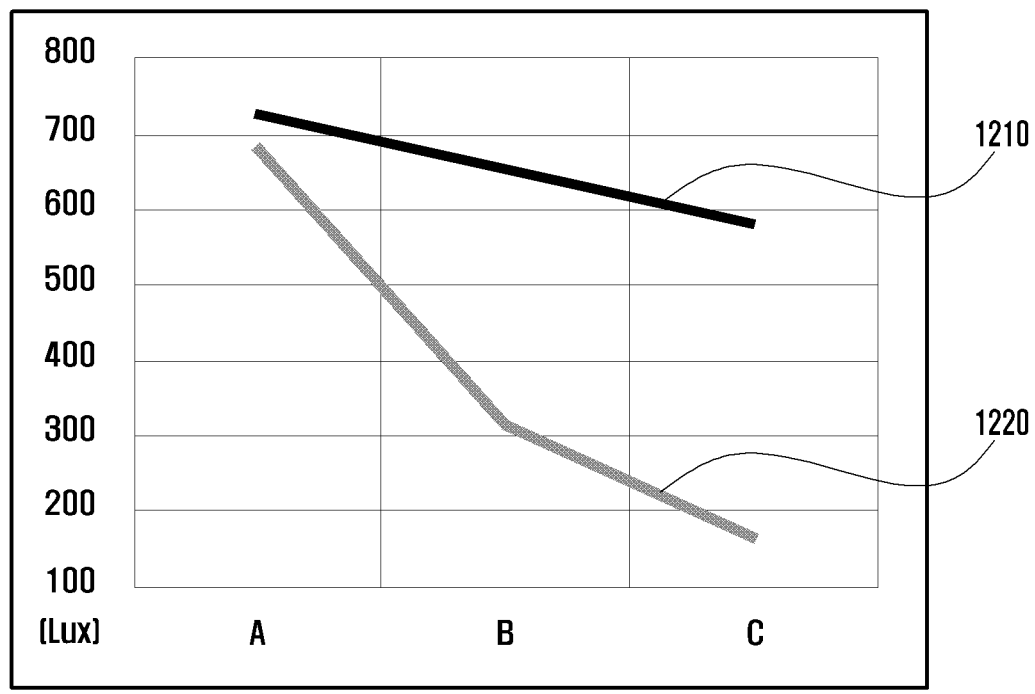
FIG. 12 illustrates a first graph illustrating an illuminance value obtained experimentally when the images in FIG. 11 are displayed in the active area, and a second graph illustrating the ratio between a color value of the active area and a color value of the sensor area.

FIG. 11 illustrates images A, B, and C that may be displayed in an active area (for example, active area 822*c* in FIG. 8) of a display (for example, display 820 in FIG. 8). FIG. 12 illustrates a first graph 1210 illustrating an illuminance value obtained experimentally (for example, illuminance value obtained by using the illuminance sensor 810 in FIG. 8) when the images A, B, and C in FIG. 11 are displayed in the active area, and a second graph 1220 illustrating a value obtained by multiplying the ratio between a color value (for example, A_COPR_W) of the active area and a color value (for example, S_COPR_W) of the sensor area (for example, sensor area 822*b*) by a predetermined value (for example, 150), in order to be compared with the first graph 1210.

Referring to FIG. 11, respective images A, B, and C may be displayed in the active area at a designated frame time (for example, 16 ms). The display (for example, display 820 in FIG. 8) or the display driver (for example, display driver 830 in FIG. 8) may generate color information of each image and may provide the color information to the processor (for example, processor 860 in FIG. 8). Color information of images displayed in the active area may differ among images A, B, and C, but color information of parts 1110, 1320, and 1330 corresponding to the sensor area may be identical. For example, as given in Table 3 below, a part corresponding to the active area of images and a part corresponding to the sensor area of the images, when images A, B, and C are displayed, may have different A_COPR R/G/B and identical S_COPR R/G/B.

TABLE 3

| image | Illuminance value (lux) | S_COPR R | S_COPR G | S_COPR B | A_COPR R | A_COPR G | A_COPR B | S_COPR W | A_COPR W | R | R * 150 |
|---|---|---|---|---|---|---|---|---|---|---|---|
| A | 725 | 243 | 243 | 244 | 118 | 116 | 114 | 164 | 36 | 4.6 | 684 |
| B | 655 | 243 | 243 | 244 | 168 | 165 | 163 | 164 | 78 | 2.1 | 314 |
| C | 580 | 243 | 243 | 244 | 222 | 221 | 219 | 164 | 148 | 1.1 | 166 |

Referring to Table 3 and the first graph 1210, when images A, B, and C are displayed in the active area, different illuminance values may be obtained experimentally. For example, it can be confirmed from Table 3 and the first graph 1210 that there is a relation between A_COPR-R/G/B of the active area and the illuminance value measured by the illuminance sensor. For example, color information (A_COPR R/G/B) in the active area and the illuminance value have an inversely proportional relation, and the reason may be as follows, for example.

In an embodiment, the luminance of a pixel may be proportional to the magnitude of current supplied to the pixel through a power line from a power supply unit (for example, power supply unit 730 in FIG. 7). It will be assumed in the description of this embodiment that the power supply unit 730 is positioned at the lower end of the display 820 with reference to FIG. 7, but those skilled in the art will easily understand that the position of the power supply unit 730 is not limited thereto. In an embodiment, the active area may function as a heavy load that consumes relatively more power when a second image B having more bright parts (for example, white color having a designated value of R/G/B or more) is displayed than when a first image A is displayed (hereinafter, referred to as first condition). Accordingly, a relatively smaller amount of current may flow to pixels in the sensor area in the case of a second condition than the first condition. Meanwhile, the illuminance sensor may have a sensitivity (for example, gain) configured to be high in order to receive external light that has passed through the sensor area. Accordingly, even in the case of a minute change in luminance of the sensor area, the illuminance value obtained by using the illuminance sensor may change relatively significantly. Consequently, although the external illuminance is identical, the luminance of the sensor area may become minutely lower under the second condition than the first condition, while the illuminance value measured by using the illuminance sensor may decrease substantially.

In an embodiment, when an image is displayed in the active area, the processor (for example, processor 860 in FIG. 8) may acquire color information of the image from the memory (for example, memory 850 in FIG. 8), for example. The processor may obtain a first color value regarding the active area and a second color value regarding the sensor area by using the color information acquired from the memory. In an embodiment, the processor may acquire A_COPR W and S_COPR W, as the first color value and the second color value, by using Equation 1 below. In Equation 1, Cr, Cg, and Cb are experimentally obtained coefficients. For example, referring to Table 3, images A, B, and C may have different A_COPR W and identical S_COPR W.

$$COPR\ W = \frac{Cr}{10000} \times COPR\ R^{2.2} + \frac{Cg}{10000} \times COPR\ G^{2.2} + \frac{Cb}{10000} \times COPR\ B^{2.2}$$ [Equation 1]

In an embodiment, the processor (for example, processor 860 in FIG. 8) may calculate a first correction value to be used when correcting an illuminance value acquired by using the illuminance sensor, based on the ratio between the first color value and the second color value.

In an embodiment, the processor (for example, processor 860 in FIG. 8) may configure a ratio so as to have a proportional relation with the illuminance value. For example, the ratio R may be configured as in Equation 2 below. It is clear from the first graph 1210 indicating the illuminance value and the second graph 1220 indicating "ratio (S COPR W/A COPR W)*150" that the ratio has been configured to have a proportional relation with the illuminance value. For example, when an image (for example, image C) including many color values, the numerical value of CORP W of which is close to 255, is displayed, a low illuminance value may be measured, and the ratio R may decrease by a relatively larger amount.

$$R = \frac{S\_COPR\ W}{A\_COPR\ W}$$ [Equation 2]

In an embodiment, the processor (for example, processor 860 in FIG. 8) may acquire Load Lux, as a first correction value, by using Equation 3 below. In Equation 3, Load a, Load b, and Load c are experimentally obtained coefficients.

$$Load\ Lux = Load\ a \times Ratio^2 + Load\ b \times Ratio + Load\ c$$ [Equation 3]

According to a comparative example to be compared with an embodiment of the disclosure, the accuracy of correction may decrease if an illuminance value is corrected by using a second color value (for example, S_COPR W). For example, referring to FIG. 8, the portable electronic device 800 may configure luminance corresponding to illuminance acquired from the illuminance sensor 810 immediately before the display 820 is turned on (for example, wakeup illuminance) as the luminance of the display 820, and may then turn the display 820 on. After the display 820 is turned on, the portable electronic device 800 may perform a hysteresis adjustment operation. For example, referring to Table 2, when the wakeup illuminance is 100 lux, the down hysteresis may be configured to be 40 lux, and the up hysteresis may be configured to be 402 lux. Accordingly, if measured illuminance is 40 lux or less, a luminance lower than the wakeup luminance may be configured as the screen luminance. If the measured illuminance is 402 lux or higher, a luminance higher than the wakeup luminance may be configured as the screen luminance. Meanwhile, if a specific image (for example, image A) is displayed in the active area 822c even after a change to a dark environment (for example, dark chamber) in which external illuminance is 40 lux or less, the processor 860 may erroneously recognize that the external illuminance is relatively higher than 40 lux due to the second color value (for example, S_COPR W), and may still maintain the luminance of the display 820 to be the wakeup luminance.

In an embodiment, the processor (for example, processor 860 in FIG. 8) may calculate an illuminance (noise component) corresponding to the luminance of the sensor area, based on the second color value and the first correction value. For example, the processor may correct the second color value to a third color value (for example, S_COPR W+Load Lux) by using the first correction value. The processor may calculate an illuminance value (noise component) corresponding to the luminance of the sensor area, based on the third color value.

In an embodiment, the processor (for example, processor 860 in FIG. 8) may remove the noise component from the illuminance value acquired by using the illuminance sensor, thereby correcting the illuminance. For example, in the case of a change to a dark environment (for example, dark chamber) in which the external illuminance is 40 lux or less while the specific image is being displayed, the processor may configure the display luminance to be lower than the wakeup luminance, thereby preventing the user's eyes from being dazzled.

When images are displayed in the active area in an environment in which external illuminance is identical, the luminance in the sensor area may differ among images, in some cases, although the first color value and the second color value are identical among images. Accordingly, a different noise component may be calculated each time, and correction of the illuminance acquired by using the illuminance sensor 810 may become inaccurate due to such a deviation. An embodiment to be described below with reference to FIG. 13A to FIG. 18B may provide an electronic device configured to reduce the above-mentioned deviation such that the accuracy of correction can be improved.

Figure 13A:
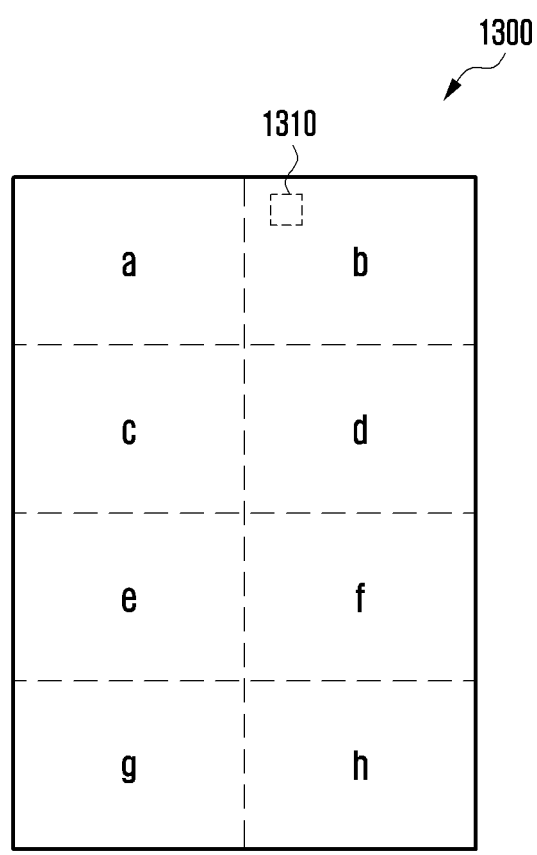
FIG. 13A illustrates an active area and a sensor area of a display.
Figure 13B:
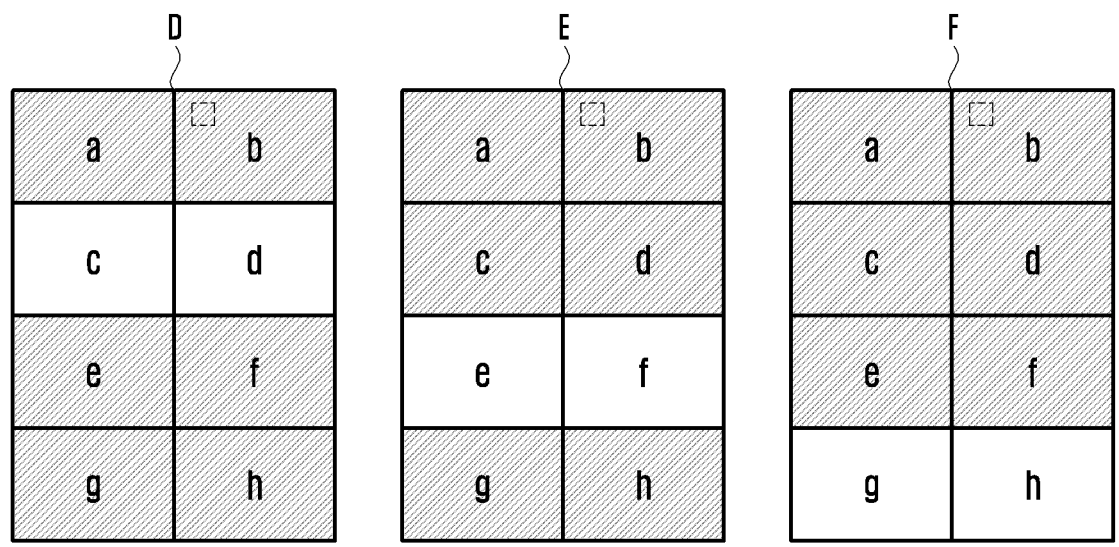
FIG. 13B illustrates images that may be displayed in the active area.
Figure 14:
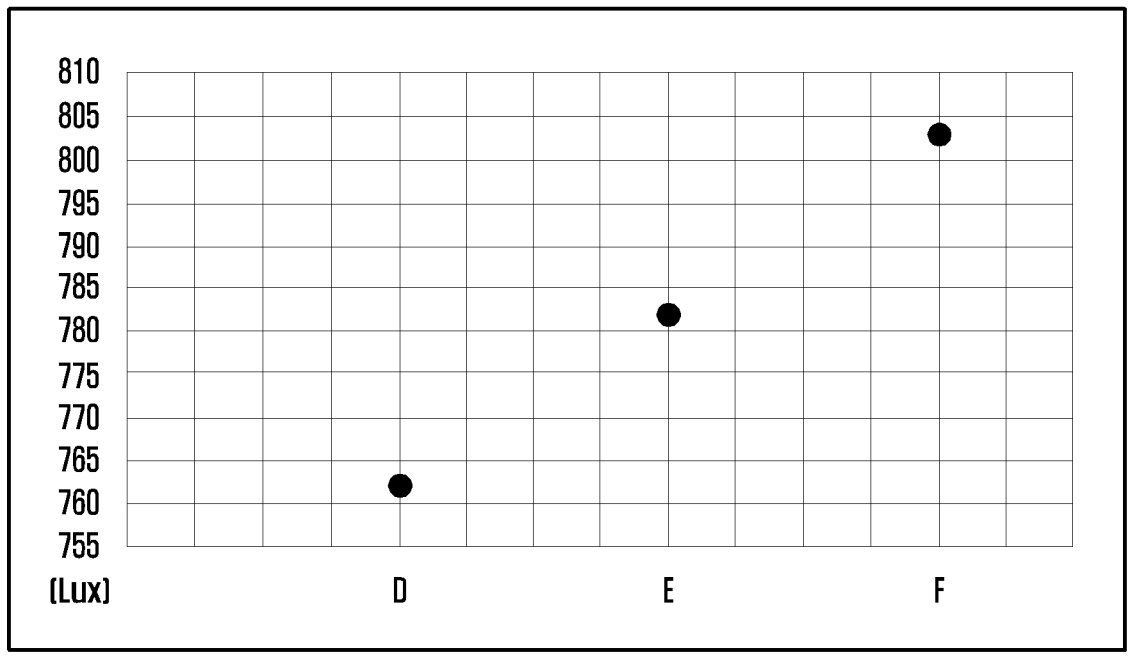
FIG. 14 illustrates a third graph illustrating an illuminance value obtained experimentally when the images in FIG. 13B are displayed in the active area.

FIG. 13A illustrates an active area 1300 and a sensor area 1310 of a display, and FIG. 13B illustrates images D, E, and F that may be displayed in the active area 1300. FIG. 14 illustrates a third graph illustrating an illuminance value obtained experimentally (for example, illuminance value obtained by using the illuminance sensor 810 in FIG. 8) when the images D, E, and F in FIG. 13 are displayed in the active area 1300.

Referring to FIG. 13A, FIG. 13B and FIG. 14, respective images D, E, and F may be displayed in the active area 1300 (for example, active area 822c in FIG. 8) at a designated frame time (for example, 16 ms). The display (for example, display 820 in FIG. 8) or the display driver (for example, display driver 830 in FIG. 8) may generate color information of each image and may provide the color information to the processor (for example, processor 860 in FIG. 8). The processor may acquire D (A_COPR W) and D (S_COPR W), as a first color value and a second color value, by using Equation 1, for example. The processor 860 may likewise acquire E (A_COPR W), E (S_COPR W), F (A_COPR W), and F (S_COPR W).

The part to be displayed in the sensor area 1310 (for example, sensor area 822b in FIG. 8) may be identical among all images D, E, and F. For example, the active area 1300 may be delimited into multiple sections a, b, c, d, e, f, g, and h according to a delimiting method as described with reference to FIG. 7 and FIG. 8. The processor may designate, among the delimited sections, "b" as a section including the sensor area 1310. The number of illustrated sections is only an example, and the technical idea of the disclosure is not limited thereto. For example, the active area 1300 may be delimited more densely or more widely than illustrated. The active area 1300 may be delimited more densely in proportion to proximity to the illuminance sensor. For example, a section close to the sensor area 1310 may have a small area, while a section relatively far from the sensor area 1310 may have a relatively large area. Second color values D (S_COPR W), E (S_COPR W), and F (S_COPR W) corresponding to the sensor area 1310 may be identical. However, although first color values D (A_COPR W), E (A_COPR W), and F (A_COPR W)) corresponding to the entire active area 1300 are also calculated identical, experimentally obtained illuminance values may differ among images D, E, and F as illustrated in FIG. 14. For example, a bright portion (for example, white) of image D is displayed in sections c and d in the active area 1300, a bright portion of image E is displayed in sections e and f in the active area 1300, and a bright portion of image F is displayed in sections g and h in the active area 1300. It is clear from FIG. 14 that the farther such a bright portion is positioned from the sensor area 1310, the higher the illuminance value becomes, on the contrary. That is, the distance between the bright portion and the sensor area 1310 is inversely proportional to the illuminance value, and the reason may be described with reference to FIG. 7 and FIG. 8, as follows:

The panel 822, the sensor area 822b, the power supply unit, and the power lines may be configured in the type and structure as in FIG. 7. As described above, a voltage drop (for example, IR drop) may occur in a power line, and a smaller amount of current may thus flow to a sub pixel (sensor area 822b) disposed relatively far from the power supply unit than a sub pixel disposed close to the power supply unit. However, as the bright portion moves toward the power supply unit, the voltage drop in the power line may decrease. The current flowing to the pixel in the sensor area 822b may increase in proportion to the amount of decrease in the voltage drop, and the luminance of the sensor area 822b may increase in proportion to the amount of increased current. Meanwhile, the illuminance sensor may have a sensitivity (for example, gain) configured to be high because the illuminance sensor receives external light that has passed through the sensor area 822b. Accordingly, even in the case of a minute change in luminance of the sensor area 822b, the illuminance value obtained by using the illuminance sensor may change relatively large. Consequently, although the external illuminance is identical, and although color values corresponding to the active area 822c are calculated equal, the luminance of the sensor area 822b may minutely change according to the distance between the bright portion and the sensor area 822b. Such a minute change may result in a large error in the illuminance value measured by using the illuminance sensor.

Unlike the structure as in FIG. 7, the power supply unit may be disposed close to the sensor area (for example, adjacent to the fourth side 710d in FIG. 7). In such a case, the distance between the bright portion and the sensor area 822b may be proportional to the luminance of the sensor area 822b.

In an embodiment, the processor (for example, processor 860 in FIG. 8) may delimit (or divide) the active area into multiple sections and may acquire color values with regard to respective delimited sections. Referring to FIG. 13A, for example, the processor may delimit the active area 1300 into a, b, c, d, e, f, g, and h, and may acquire color values regarding respective sections (a_COPR W, b_COPR W, c_COPR W, d_COPR W, e_COPR W, f_COPR W, g_COPR W, h_COPR W) by using Equation 1.

In an embodiment, the processor (for example, processor 860 in FIG. 8) may calculate a second correction value to be used during illuminance value correction, based on the acquired color values regarding respective sections. Referring to FIG. 13A, for example, the processor may calculate a first reference value, which denotes the distance between the brightest portion and the sensor area 1310 (hereinafter, referred to as reference distance), based on the largest value among the color values (a_COPR W, b_COPR W, c_COPR W, d_COPR W, e_COPR W, f_COPR W, g_COPR W, h_COPR W). The processor may correct the ratio R by using the first reference value and may correct the first correction value with the corrected ratio, thereby acquiring a second correction value. Alternatively, the processor may correct the first correction value by using the first reference value, thereby acquiring a second correction value. If the reference distance is inversely proportional to the luminance of the sensor area 1310, the ratio (or first correction value) may be down-adjusted as the first reference value increases. If the reference distance is proportional to the luminance of the sensor area 1310, the ratio (or first correction value) may be up-adjusted as the first reference value increases.

In an embodiment, the processor (for example, processor 860 in FIG. 8) may calculate an illuminance value (for example, noise component) corresponding to the luminance of the sensor area 822b, based on the second color value and the second correction value, and may remove the noise component from the illuminance value acquired by using the illuminance sensor 810, thereby correcting the illuminance value.

In an embodiment illustrated in FIG. 13A, multiple sections are delimited into multiple sections a, b, c, d, e, f, g, and h with reference to a direction in which gate lines GL1-GLm extend (for example, second direction B in FIG. 7) and a direction in which lines VL1-VLm extend (for example, first direction A in FIG. 7), but this is not limiting in any manner. For example, multiple sections may be delimited only in the first direction A.

Figure 15:
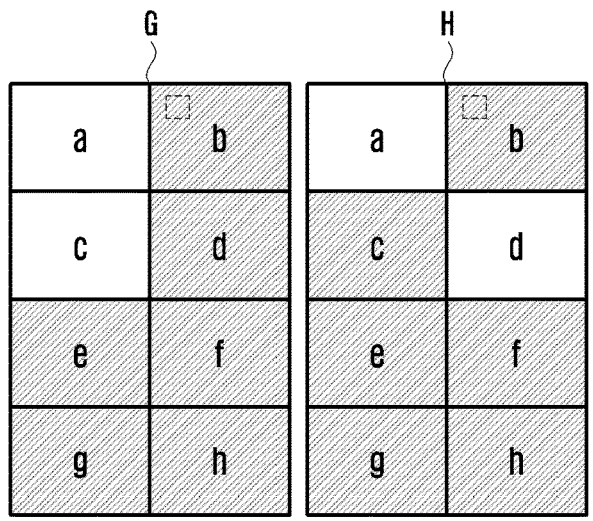
FIG. 15 illustrates images that may be displayed in the active area in FIG. 13A.
Figure 15:
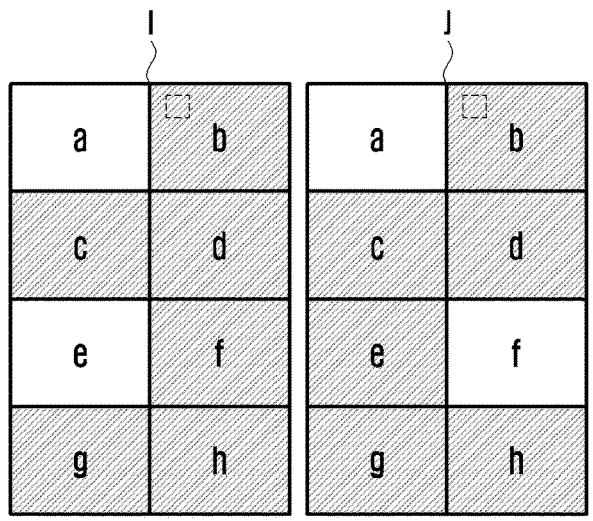
Figure 15:
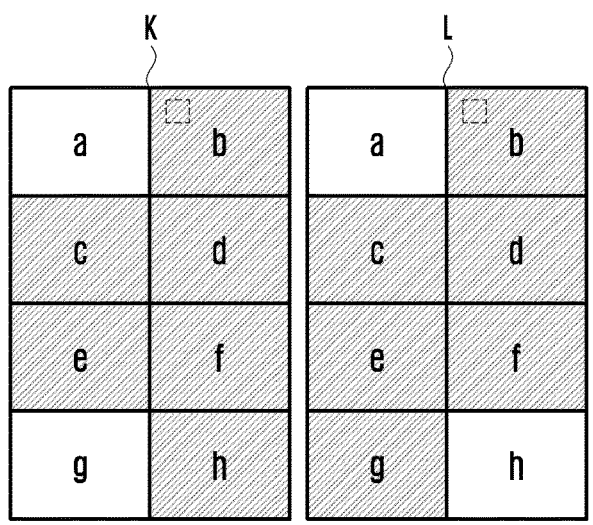
Figure 16:
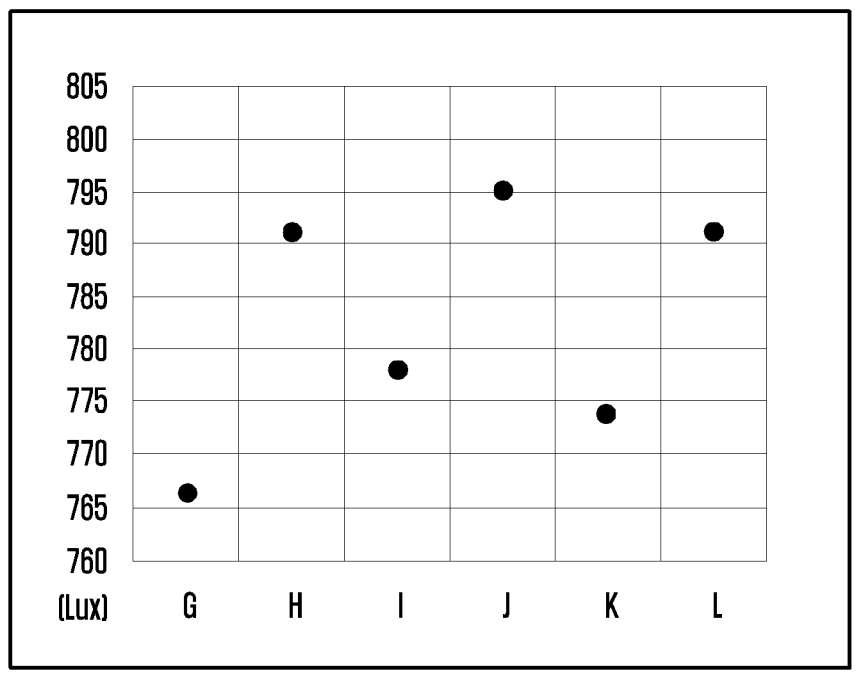
FIG. 16 illustrates a fourth graph illustrating an illuminance value obtained experimentally when the images in FIG. 15 are displayed in the active area.

FIG. 15 illustrates images G, H, I, J, K, and L that may be displayed in the active area 1300 in FIG. 13A. FIG. 16 illustrates a fourth graph illustrating an illuminance value obtained experimentally when the images in FIG. 15 are displayed in the active area 1300.

According to various embodiments, the active area 1300 may be delimited into multiple sections a, b, c, d, e, f, g, and h according to a designated delimiting method. Sections may be delimited with reference to the position of the illuminance sensor (for example, illuminance sensor in FIG. 6) or the position of the sensor area 1310. For example, the electronic device (for example, display driver 830 in FIG. 8) may use a line (for example, power line), with reference to the position of the illuminance sensor or the position of the sensor area 1310, so as to delimit sections such that the sensor area 1310 is included in a group thereof and is not included in another group thereof. For example, sections may be delimited by the processor with reference to a line (for example, power line number 20) such that section "b" includes the sensor area 1310. It will be assumed, for convenience of description, that, with reference to a line used for delimitation, sections (for example, sections "b", "d", "f", and "h") in the same row or column are positioned on the same line.

Referring to FIG. 15 and FIG. 16, although all images have the same ratio occupied by a bright portion (for example, white color) in each image, the luminance of the sensor area 1310 may be higher when more bright portions are on the same line with a section including the sensor area 1310. For example, a comparison between images G and H shows that, although both images have the same ratio of bright portion, the bright portion of image H is positioned on the same line with the section in which the sensor area 1310 is positioned, and the bright portion of image G is not positioned on the same line with a portion to be displayed in section b. It can be confirmed from FIG. 16, as a result thereof, that the illuminance value when image H is displayed is higher than the illuminance value when image G is displayed.

In an embodiment, the processor (for example, processor 860 in FIG. 8) may group sections b, d, f, and h positioned on the same line with section b including the sensor area 1310, among the delimited sections a, b, c, d, e, f, g, and h, into a first group, and may group sections a, c, e, and g positioned on a different line into a second group. The processor may acquire color values of the first group (for example, b_COPR W, d_COPR W, f_COPR W, h_COPR W) and color values of the second group (for example, a_COPR W, c_COPR W, e_COPR W, f_COPR W) by using Equation 1, for example.

In an embodiment, the processor (for example, processor 860 in FIG. 8) may calculate a third correction value to be used when correcting an illuminance value acquired by using the illuminance sensor, based on color values of the first and second groups. For example, the processor may calculate a second reference value, which corresponds to a difference between the color of the first group and the color of the second group. For example, the second reference value may indicate a difference between the average of color values of the first group and the average of color values of the second group. The processor may correct the ratio R by using the second reference value, and may correct the first correction value by using the corrected ratio, thereby acquiring a third correction value. Alternatively, the processor may correct the second correction value by using the second reference value, thereby acquiring a third correction value. For example, if the second reference value indicates that the second group is brighter than the first group, the ratio (or second correction value) may be down-adjusted to a lower value.

Figure 17A:
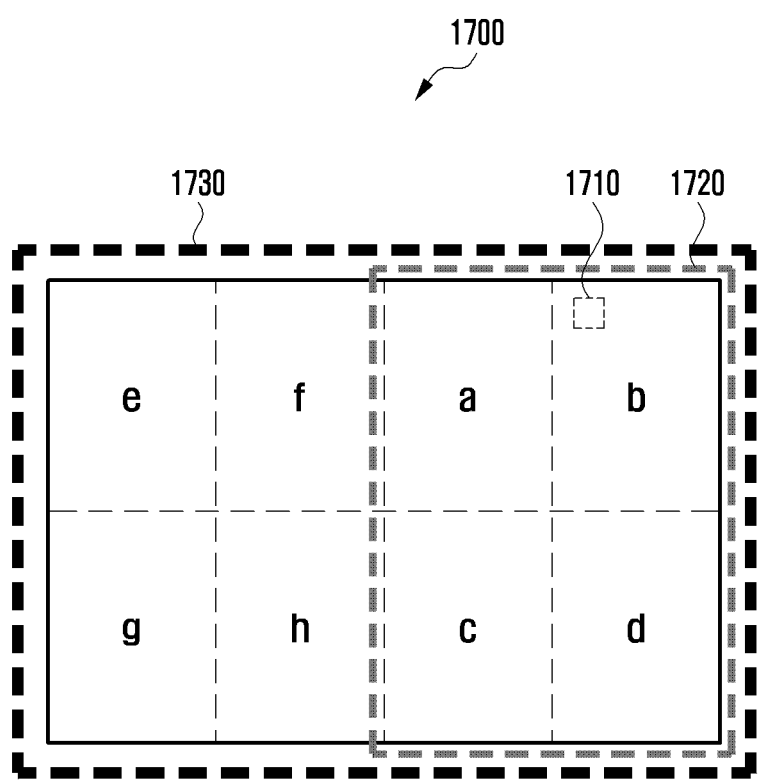
FIG. 17A illustrates a display, an active area of which is adjustable, according to an embodiment.
Figure 17B:
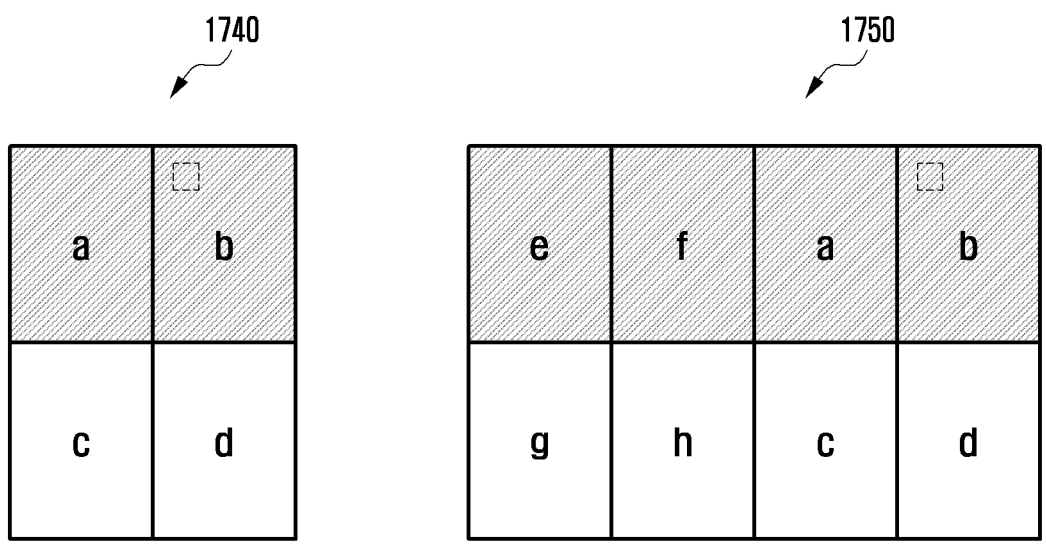
FIG. 17B illustrates images that may be displayed in the active area of the display.

FIG. 17A illustrates a display 1700, the active area of which is adjustable, according to an embodiment, and FIG. 17B illustrates images 1740 and 1750 that may be displayed in the active area of the display 1700.

Referring to FIG. 17A, the display 1700 may be the display 440 mounted on the portable electronic device 400 in FIG. 4, and may be delimited into multiple sections a, b, c, d, e, f, g, and h by a delimiting method described with reference to FIG. 7 and FIG. 8. Among the delimited sections, section b may be designated by the processor (for example, processor 860 in FIG. 8) as a section including a sensor area 1710, below which an illuminance sensor is disposed. The closer to the illuminance sensor, the more densely the display 1700 may be delimited. For example, when the power supply unit is disposed adjacent to the lower side (for example, third side 710c in FIG. 7) of the panel, when the illuminance sensor is disposed adjacent to the upper side (for example, fourth side 710d in FIG. 7), and when the power lines extend from the lower side to the upper side, the closer to the illuminance sensor, the severer voltage drop (for example, IR drop) may occur. Accordingly, the processor may delimit a part of the display 1700 adjacent to the illuminance sensor more densely than a part of the display 1700 adjacent to the power supply unit. In an embodiment, the processor (for example, processor 860 in FIG. 8) may determine an active area in the display 1700 according to the state of the portable electronic device, and may delimit the active area into multiple sections. For example, when the portable electronic device is recognized to be in a folded state, the processor may determine a portion 1720 of the display area 1730 as an active area, and may delimit the portion 1720 into multiple sections, for example, a, b, c, and d. The processor may display a first image 1740 in FIG. 17B in the portion 1720 designated as the active area, and may acquire a color value (A_COPR W) regarding the entire active area (for example, portion 1720) and color values regarding respective sections (a_COPR W, b_COPR W, c_COPR W, d_COPR W), based on color information received from the display 1700, by using Equation 1, for example. The processor may obtain a correction value to be used during illuminance value correction, based on the acquired color values. For example, the processor may calculate the ratio between the color value (b_COPR W) of section b including the sensor area 1710 and the color value (A_COPR W) regarding the entire active area by using Equation 2, for example, and may obtain a correction value (for example, Load Lux in Equation 3) by using the calculated ratio. The processor may calculate a noise component by using the color value (COPR W) of section b including the sensor area 1710 and the calculated correction value, and may remove the noise component from an illuminance value acquired by using the illuminance sensor, thereby correcting the illuminance value.

In an embodiment, the processor (for example, processor 860 in FIG. 8) may apply (for example, multiply) a weight to a ratio (for example, ratio calculated by using Equation 2) or a correction value (for example, Load Lux in Equation 3), based on the display position of a bright portion (for example, white color) of an image to be displayed on the display 1700. For example, the processor may obtain a correction value, based on the distance between section b designated as a sensor area 1710 and a section (for example, section d) having the largest color value (COPR W) among other sections. For example, the distance may be a distance between the center coordinate of section b and the center coordinate of section d. As another example, the processor may group sections (for example, sections b and d) positioned on the same line with section b including the sensor area 1710 into a first group, and may group sections (for example, sections a and c) positioned on a different line from section b into a second group. The processor may obtain a correction value, further based on a difference between the color of the first group and the color of the second group (for example, difference value between the average of color values of the first group and the average of color values of the second group).

In an embodiment, the processor (for example, processor 860 in FIG. 8) may change the active area of the display 1700 as the state of the portable electronic device changes. For example, the processor may recognize a change in state of the portable electronic device from a folded state to an unfolded state. In response to such a state change, the processor may determine the entire display area 1730 as an active area, and may delimit the display area 1730 into multiple sections, for example, a, b, c, d, e, f, g, and h. The processor may designate section b, among the delimited sections, as a section including a sensor area 1710 below which an illuminance sensor is disposed. The processor may display an image 1750 in the entire display area 1730 designated as the active area, and may acquire a color value (A_COPR W) regarding the entire active area (that is, display area 1730) and color values regarding respective sections (a_COPR W, b_COPR W, c_COPR W, d_COPR W, e_COPR W, f_COPR W, g_COPR W, h_COPR W), based on color information received from the display 1700, by using Equation 1, for example. The processor may obtain a correction value by using the acquired color values, and may correct an illuminance value by using the correction value.

In an embodiment illustrated in FIG. 17A, multiple sections are delimited into multiple sections a, b, c, d, e, f, g, and h with reference to a direction in which gate lines GL1-GLm extend (for example, $12^{th}$ direction BA in FIG. 7) and a direction in which lines VL1-VLm extend (for example, $12^{th}$ direction BA in FIG. 7), but this is not limiting in any manner. For example, multiple sections may be delimited only in the first direction A.

Figure 18A:
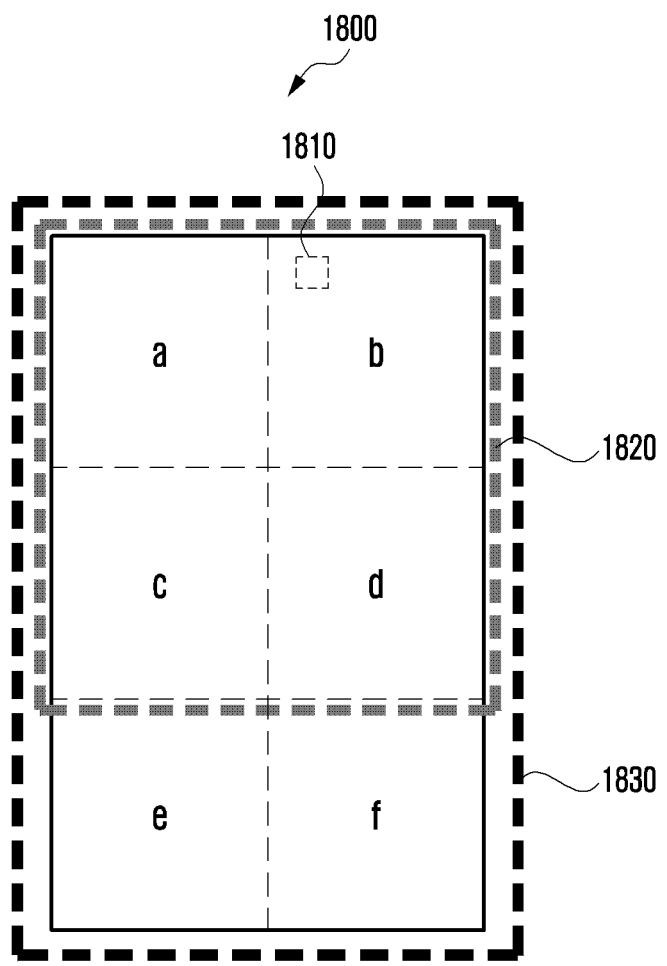
FIG. 18A illustrates a display, an active area of which is adjustable, according to an embodiment.
Figure 18B:
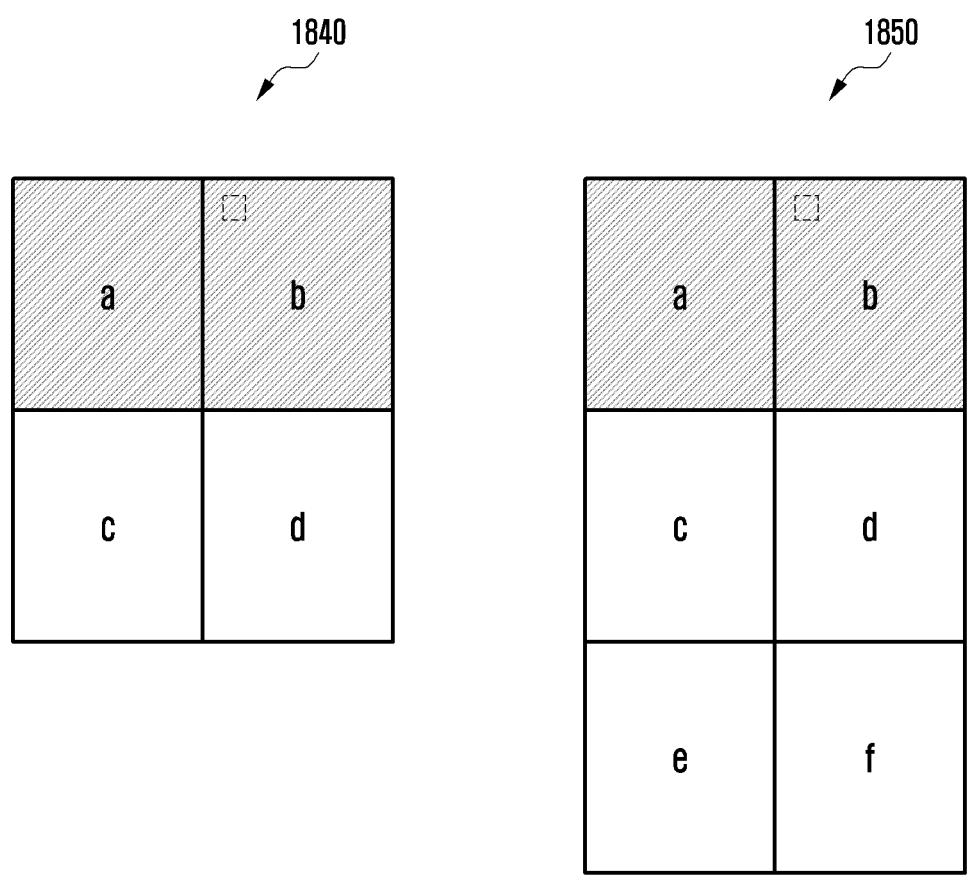
FIG. 18B illustrates images that may be displayed in the active area of the display.

FIG. 18A illustrates a display 1800, the active area of which is adjustable, according to an embodiment, and FIG. 18B illustrates images 1840 and 1850 that may be displayed in the active area of the display 1800. Referring to FIG. 18A, the display 1800 may be the display 530 mounted on the portable electronic device 500 in FIG. 5. In an embodiment, the processor (for example, processor 860 in FIG. 8) may determine an active area of the display 1800 according to the state of the portable electronic device, and may delimit the active area into multiple sections. For example, when the portable electronic device is recognized to be in a first state (or normal state), the processor may determine a portion 1820 of the display area 1830 as an active area. The processor may display a first image 1840 in the active area (portion 1820). The processor may delimit the portion 1820 designated as the active area into multiple sections, for example, a, b, c, and d, and may designate section b among the multiple sections as a section including a sensor area 1810. When the portable electronic device is recognized to be in a second state (or extended state), the processor may designate the entire display area 1830 as an active area. The processor may display a second image 1850 in the entire display area 1830. The processor may delimit the entire display area 1830 designated as the active area into multiple sections, for example, a, b, c, d, e, and f, and may designate section b among the multiple sections as a section including a sensor area 1810. The processor may correct an illuminance value in the same method as used in FIGS. 17A and 17B.

Figure 19:
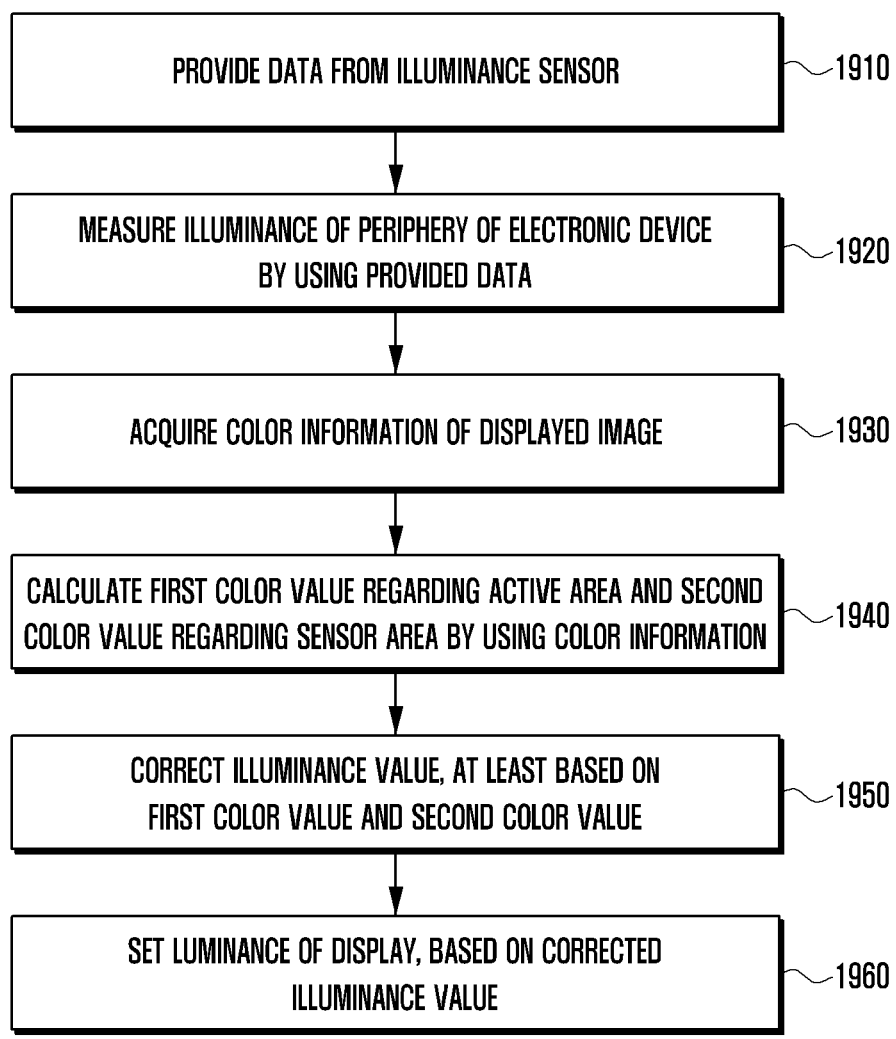
FIG. 19 illustrates operations for configuring the luminance of a screen by using an illuminance sensor according to various embodiments.

FIG. 19 illustrates operations for configuring the luminance of a screen by using an illuminance sensor according to various embodiments.

In operation 1910, the illuminance sensor 810 may receive light during a designated measurement time, may convert the received light into data, and may provide the data to a processor 860.

In operation 1920, the processor 860 may measure the illuminance of the periphery of an electronic device 800 by using data received from the illuminance sensor 810, in response to an interrupt signal generated by the illuminance sensor 810 at the data providing time point.

In operation 1930, the processor 860 may acquire color information (for example, COPR, AOR) of an image displayed in an active area 822c. For example, the processor 860 may determine an active area (for example, active area 822c in FIG. 8) in which an image is to be displayed in a display area (for example, display area 822a in FIG. 8), based on the state of the electronic device 800. A display 820 may display an image at each designated frame time in the active area 822c determined by the processor 860. The display 820 (for example, DDI 821) or display driver 830 may provide color information corresponding to the image displayed (or to be displayed) in the active area 822c to the processor 860. The processor 860 may update color information stored in a memory 850 to the provided color information. The processor 860 may acquire updated color information from the memory 850 in response to an interrupt signal. Additionally, the processor 860 may delimit the active area 822c into multiple sections by the delimiting method described with reference to FIG. 7 and FIG. 8.

In operation 1940, the processor 860 may obtain a first color value regarding the active area 822c and a second color value regarding the sensor area 822b (or section including the sensor area) by using acquired color information. Additionally, the processor 860 may acquire color values regarding respective delimited sections.

In operation 1950, the processor 860 may correct an illuminance value acquired as a result of measuring peripheral illuminance, at least based on the first color value and the second color value. For example, the processor 860 may obtain a first correction value by using Equations 1, 2, and 3, may correct a second color value into a third color value by using the first correction value, may calculate an illuminance value (noise component) corresponding to the luminance of the sensor area 822b (or section including the sensor area), based on the third color value, and may remove the noise component from the illuminance value acquired as a measurement result. As another example, the processor 860 may obtain a second correction value based on acquired color values regarding respective sections, may calculate an illuminance value (noise component) corresponding to the sensor area 822b (or section including the sensor area), based on the second color value and the second correction value, and may remove the noise component from an illuminance value acquired by using the illuminance sensor 810. As another example, the processor 860 may divide delimited sections into a first group positioned on the same line (power line) as a portion to be displayed on a section including the sensor area 822b and a second group positioned on a different line, and may calculate a third correction value, based on the color value of the first group and the color value of the second group (for example, average color value of first group and average color value of second group). An illuminance value (noise component) corresponding to the section including the sensor area 822b may be calculated based on the second color value and the third correction value, and the noise component may be removed from an illuminance value acquired by using the illuminance sensor 810.

In operation 1960, the processor 860 may set or configure the luminance of the display 820 based on the corrected illuminance value.

A portable electronic device according to various embodiments may include a housing (for example, housing 310 in FIG. 3, housings 410 and 420 in FIG. 4, or housings 510 and 520 in FIG. 5) including a front surface and a rear surface; a display disposed in a space formed inside the housing and exposed through the front surface: an illuminance sensor disposed below a sensor area in an active area (for example, active area 822c in FIG. 8) of the display, in which visual information is to be displayed; and a processor connected to the display and the illuminance sensor, where the processor is configured to calculate an illuminance value based on data received from the illuminance sensor, obtain color information of an image displayed in the active area, calculate a first color value regarding the active area and a second color value regarding the sensor area based on the color information, correct the illuminance value, based on the first color value and the second color value, and set luminance of the display based on the corrected illuminance value.

The processor may be configured to calculate the first color value based on a ratio of RGB in the active area acquired from the color information, and calculate the second color value based on a ratio of RGB in the sensor area acquired from the color information. The ratio of RGB in the active area may include an average of R values to be displayed at pixels in the active area, an average of G values, and an average of B values. The ratio of RGB in the sensor area may include an average of R values to be displayed at pixels in the sensor area, an average of G values, and an average of B values.

The processor may be configured to obtain a color ratio of the second color value to the first color value, and calculate a first correction value to be used in correcting the calculated illuminance value, based on the color ratio. The processor may be configured to correct the second color value to a third color value based on the first correction value, calculate a noise component corresponding to luminance of the sensor area based on the third color value, and correct the illuminance value by removing the noise component from the illuminance value.

The display may include a panel including multiple pixels and multiple power lines for supplying power to the pixels, and a display driver IC (DDI) configured to control the panel to display visual information, and the processor may be configured to delimit the active area into multiple sections along a first direction in which the multiple power lines extend, calculate color values of the multiple sections based on the color information, and acquire a second correction value to be used in correcting the calculated illuminance value by correcting the color ratio or the first correction value, based on the color values of the multiple sections.

The processor may be configured to delimit each of the delimited multiple sections into multiple sub sections along a second direction perpendicular to the first direction.

The processor may be configured to delimit a first part of the active area into multiple first sections along a direction of extension of a first power line on which the sensor area is positioned, among the multiple power lines, delimit a second part of the active area into multiple second sections along a direction of extension of a second power line on which the sensor area is not positioned, and acquire a third correction value to be used in correcting the calculated illuminance value by correcting the color ratio or the second correction value, based on a difference between a color value of the first sections obtained based on the color information and a color value of the second sections obtained based on the color information.

The panel may have a quadrangular shape having a first side extending in a first direction, a second side extending in parallel to the first side, a third side extending in a second direction perpendicular to the first direction, and a fourth side extending in parallel to the third side, the power lines may extend from the first side to the second side in parallel to the first direction, a power supply unit may be disposed adjacent to the first side to supply power to the pixels through the power lines, and the illuminance sensor may be disposed adjacent to the second side.

The portable electronic device may further include a state sensing sensor configured to generate data used to recognize structurally different multiple states of the portable electronic device, and the processor may be configured to recognize a structural state of the portable electronic device, based on data received from the state sensing sensor, and determine the active area in a display area of the display, based on the recognized state.

The housing may include a first housing and a second housing coupled to the first housing to be able to slide from the first housing, the display may include a first display area and a second display area configured to be exposed from the housing when the second housing slides away from the first housing and to move into the housing when the second housing slides toward the first housing, and the processor may be configured to determine the first display area as the active area based on the portable electronic device being in a first state in which the second display area is hidden, and determine the first display area and the second display area as the active area based on the portable electronic device being in a second state in which the second display area is exposed.

The second display area may be wound around a rotatable assembly disposed inside the second housing when the second housing slides toward the first housing, and may be unwound from the rotatable assembly when the second housing slides away from the first housing, and the state sensing sensor may include an encoder sensor or a Hall sensor attached to the rotatable assembly.

The housing may include a first housing and a second housing coupled to the first housing to be able to rotate, the display may include a first display area disposed on the first housing and a second display area disposed on the second housing, and the processor may be configured to recognize that the portable electronic device is in a first state or a second state, based on data indicating an angle between the first housing and the second housing received from the state sensing sensor, determine the first display area or the second display area as the active area based on the portable electronic device being in the first state, and determine the first display area and the second display area as the active area based on the portable electronic device being in the second state. The state sensing sensor may include: an encoder sensor or a Hall sensor attached to a hinge assembly connecting the first housing and the second housing; or a first motion sensor disposed in the first housing and a second motion sensor disposed in the second housing.

The display may include a display driver IC (DDI) and a panel, and the DDI may be configured to control the panel so as to output an image frame by frame, and to transmit color on pixel ratio (COPR) information of a frame to be output to the processor as the color information.

A portable electronic device according to various embodiments may include a slidable housing (for example, housings 510 and 520 in FIG. 5) including a first housing and a second housing coupled to the first housing to be able to slide with regard to the first housing: a roller unit (or rotatable assembly); a flexible display including a first area disposed adjacent to the first housing and a second area disposed in an inner space of the portable electronic device: an illuminance sensor disposed below a sensor area in an active area of the display, the active area being an area of the display in which visual information is to be displayed: a processor connected to the display and the illuminance sensor; and a memory connected to the processor, and the memory may store instructions which, when executed, cause the processor to perform: an operation of calculating an illuminance value based on data received from the illuminance sensor, an operation of obtaining color information of an image displayed in the active area, an operation of calculating a first color value of the active area and a second color value of the sensor area based on the color information, an operation of correcting the illuminance value based on the first color value and the second color value, and an operation of setting luminance of the display based on the corrected illuminance value.

Various embodiments may provide an electronic device configured to correct an illuminance value by considering a luminance deviation in a sensor area occurring when images are displayed on a display, thereby improving the accuracy of measurement regarding external illuminance.

Embodiments of the disclosure disclosed in the specification and the drawings are only specific examples given to easily describe technical contents according to embodiments of the disclosure and to help understanding of embodiments of the disclosure, and are not intended to limit the scope of embodiments of the disclosure. Therefore, the scope of various embodiments of the disclosure are to be interpreted as encompassing all changed or modified forms derived based on technical ideas of various embodiments of the disclosure, in addition to the embodiments disclosed herein.

What is claimed is:

1. An electronic device comprising:
   a housing comprising a front surface and a rear surface;
   a display provided in the housing and exposed through the front surface of the housing;
   an illuminance sensor provided below a sensor area in an active area of the display, the active area being an area of the display in which visual information is to be displayed;
   a processor; and
   a memory storing instructions that, when executed by the processor, cause the electronic device to:
   determine an illuminance value based on data received from the illuminance sensor;
   obtain color information of an image displayed in the active area;
   determine a first color value of the active area and a second color value of the sensor area in the active area of the display based on the color information;
   obtain a color ratio of the second color value to the first color value;
   adjust the illuminance value based on the color ratio; and
   configure a luminance of the display based on the adjusted illuminance value.

2. The electronic device of claim 1, wherein the instructions, when executed by the processor, cause the electronic device to:
   determine the first color value based on a ratio of red, green, and blue (RGB) values of pixels in the active area obtained from the color information; and
   determine the second color value based on a ratio of RGB values of pixels in the sensor area obtained from the color information.

3. The electronic device of claim 2, wherein the ratio of the RGB values in the active area comprises an average of R values to be displayed at the pixels in the active area, an average of G values to be displayed at the pixels in the active area, and an average of B values to be displayed at the pixels in the active area, and
   the ratio of the RGB values in the sensor area comprises an average of R values to be displayed at the pixels in the sensor area, an average of G values to be displayed at the pixels in the sensor area, and an average of B values to be displayed at the pixels in the sensor area.

4. The electronic device of claim 2, wherein the instructions, when executed by the processor, cause the electronic device to determine a first correction value to be used in adjusting the determined illuminance value, based on the color ratio.

5. The electronic device of claim 4, wherein the instructions, when executed by the processor, cause the electronic device to:
   adjust the second color value to a third color value based on the first correction value;
   determine a noise component corresponding to a luminance of the sensor area based on the third color value; and
   adjust the illuminance value by removing the noise component from the illuminance value.

6. The electronic device of claim 4, wherein the display comprises:
   a panel comprising pixels and power lines for supplying power to the pixels; and
   a display driver IC (DDI) configured to control the panel to display the visual information, and
   wherein the instructions, when executed by the processor, cause the electronic device to:
   delimit the active area into a plurality of sections along a first direction in which the power lines extend,
   determine color values of the plurality of sections based on the color information; and
   obtain a second correction value to be used in adjusting the determined illuminance value by adjusting the color ratio or the first correction value based on the color values of the plurality of sections.

7. The electronic device of claim 6, wherein the instructions, when executed by the processor, cause the electronic device to delimit each of the plurality of sections into a plurality of sub sections along a second direction perpendicular to the first direction.

8. The electronic device of claim 6, wherein the instructions, when executed by the processor, cause the electronic device to:
   delimit a first part of the active area into a plurality of first sections along a direction of extension of a first power line on which the sensor area is positioned among the power lines;

delimit a second part of the active area into a plurality of second sections along a direction of extension of a second power line on which the sensor area is not positioned; and obtain a third correction value to be used in adjusting the determined illuminance value by adjusting the color ratio or the second correction value based on a difference between a color value of the plurality of first sections obtained based on the color information and a color value of the plurality of second sections obtained based on the color information.

9. The electronic device of claim 6, wherein the panel has a quadrangular shape having a first side, a second side extending in parallel to the first side, a third side extending perpendicular to the first side, and a fourth side extending in parallel to the third side, wherein the power lines extend from the first side to the second side in parallel to the first side, wherein a power supply unit is adjacent to the first side to supply power to the pixels through the power lines, and wherein the illuminance sensor is adjacent to the second side.

10. The electronic device of claim 1, further comprising a state sensing sensor configured to generate data used to recognize structurally different multiple states of the electronic device, wherein the instructions, when executed by the processor, cause the electronic device to:

recognize a structural state of the electronic device based on data received from the state sensing sensor; and determine the active area in a display area of the display based on the recognized state.

11. The electronic device of claim 10, wherein the housing comprises a first housing and a second housing coupled to the first housing and configured to slide with respect the first housing, wherein the display comprises a first display area and a second display area, wherein the second display area is configured to be exposed from the housing in case that the second housing slides away from the first housing and to move into the housing in case that the second housing slides toward the first housing, and wherein the instructions, when executed by the processor, cause the electronic device to:

determine the first display area as the active area based on the electronic device being in a first state in which the second display area is hidden; and determine the first display area and the second display area as the active area based on the electronic device being in a second state in which the second display area is exposed.

12. The electronic device of claim 11, wherein the second display area is wound around a rotatable assembly provided in the second housing in case that the second housing slides toward the first housing, and is unwound from the rotatable assembly in case that the second housing slides away from the first housing, and wherein the state sensing sensor comprises an encoder sensor or a Hall sensor attached to the rotatable assembly.

13. The electronic device of claim 10, wherein the housing comprises a first housing and a second housing coupled to the first housing to be able to rotate, wherein the display comprises a first display area provided on the first housing and a second display area provided on the second housing, and wherein the instructions, when executed by the processor, cause the electronic device to:

recognize that the electronic device is in a first state or a second state based on data indicating an angle between the first housing and the second housing received from the state sensing sensor;

determine the first display area or the second display area as the active area based on the electronic device being in the first state; and determine the first display area and the second display area as the active area based on the electronic device being in the second state.

14. The electronic device of claim 13, wherein the state sensing sensor comprises:

an encoder sensor or a Hall sensor attached to a hinge assembly connecting the first housing and the second housing; or a first motion sensor provided in the first housing and a second motion sensor provided in the second housing.

15. An electronic device comprising:

a slidable housing comprising a first housing and a second housing coupled to the first housing and configured to slide with regard to the first housing;

a flexible display comprising a first area adjacent to the first housing and a second area provided in an inner space of the electronic device;

an illuminance sensor provided below a sensor area in an active area of the display, the active area being an area of the display in which visual information is to be displayed;

a processor, and a memory storing instructions that, when executed by the processor, cause the electronic device to:

determine an illuminance value by using data received from the illuminance sensor;

obtain color information of an image displayed in the active area;

determine a first color value of the active area and a second color value of the sensor area in the active area of the display based on the color information;

obtain a color ratio of the second color value to the first color value;

adjust the illuminance value based on the color ratio; and configure a luminance of the display based on the adjusted illuminance value.

16. A method for controlling an electronic device including a display and an illuminance sensor provided in the display, the method comprising:

determining an illuminance value based on data received from the illuminance sensor;

obtaining color information of an image displayed in an active area of the display;

determining a first color value of the active area and a second color value of a sensor area in the active area of the display based on the color information;

obtaining a color ratio of the second color value to the first color value;

adjusting the illuminance value based on the color ratio; and configuring luminance of the display based on the adjusted illuminance value.

17. The method of claim 16, wherein the determining the first color value comprises determining the first color value based on a ratio of red, green, and blue (RGB) values of pixels in the active area obtained from the color information, and wherein the determining the second color value comprises determining the second color value based on a ratio of RGB values of pixels in the sensor area obtained from the color information.

18. The method of claim 17, wherein the ratio of the RGB values in the active area comprises an average of R values to be displayed at the pixels in the active area, an average of G values to be displayed at the pixels in the active area, and an average of B values to be displayed at the pixels in the active area, and wherein the ratio of the RGB values in the sensor area comprises an average of R values to be displayed at the pixels in the sensor area, an average of G values to be displayed at the pixels in the sensor area, and an average of B values to be displayed at the pixels in the sensor area.

19. The method of claim 17, further comprising:
determining a first correction value to be used in adjusting the determined illuminance value based on the color ratio.

20. The method of claim 19, further comprising:
adjusting the second color value to a third color value based on the first correction value;
determining a noise component corresponding to a luminance of the sensor area based on the third color value; and
adjusting the illuminance value by removing the noise component from the illuminance value.

* * * * *